(12) United States Patent
Takeda et al.

(10) Patent No.: US 12,267,848 B2
(45) Date of Patent: Apr. 1, 2025

(54) UPLINK SHARED CHANNEL RESOURCE ALLOCATION FOR MULTI-CELL SCHEDULING

(71) Applicant: QUALCOMM Incorporated, San Diego, CA (US)

(72) Inventors: Kazuki Takeda, Tokyo (JP); Mostafa Khoshnevisan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 366 days.

(21) Appl. No.: 17/884,326

(22) Filed: Aug. 9, 2022

(65) Prior Publication Data

US 2024/0057094 A1  Feb. 15, 2024

(51) Int. Cl.
*H04W 72/23*  (2023.01)
(52) U.S. Cl.
CPC .................................. *H04W 72/23* (2023.01)
(58) Field of Classification Search
CPC .... H04W 72/23; H04W 72/232; H04W 72/04
USPC ........................................................ 370/329
See application file for complete search history.

(56) References Cited

U.S. PATENT DOCUMENTS

| | | | |
|---|---|---|---|
| 2021/0227528 A1* | 7/2021 | Bang | H04W 72/1268 |
| 2021/0314938 A1* | 10/2021 | Kim | H04L 5/001 |
| 2022/0312336 A1* | 9/2022 | He | H04W 72/0446 |
| 2022/0377619 A1* | 11/2022 | Grant | H04L 5/0044 |
| 2023/0073001 A1* | 3/2023 | He | H04W 56/0015 |
| 2024/0015760 A1* | 1/2024 | Awadin | H04W 72/232 |
| 2024/0204931 A1* | 6/2024 | Xiong | H04L 5/0053 |

OTHER PUBLICATIONS

Intel Corporation: "Discussions on multi-cell scheduling with a single DCI",3GPP Draft; R1-2204816, 3rd Generation Partnership Project (3GPP), Mobile Competence Centre ; 650, Route Des Lucioles ; F-06921 Sophiaantipolis Cedex; France, vol. RAN WG1, No. e-Meeting; May 9, 2022-May 30, 2022 Apr. 2022 (Year: 2022).*

(Continued)

*Primary Examiner* — Hashim S Bhatti
*Assistant Examiner* — Oladiran Gideon Olaleye
(74) *Attorney, Agent, or Firm* — Holland & Hart LLP/Qualcomm

(57) ABSTRACT

Methods, systems, and devices for wireless communications are described for uplink shared channel resource allocation for multi-cell scheduling. A user equipment (UE) may receive a downlink control information (DCI) message including a first set of bits and a second set of bits defining resource allocation across multiple network entities, as well as indicating that uplink shared channel messages to a first network entity and a second network entity are scheduled according to a resource allocation type. The first set of bits may indicate one or more resource block indices and the second set of bits may indicate one or more resource block set indices. The UE may transmit the uplink shared channel messages to the first network entity and the second network entity according to the first set of bits and the second set of bits.

30 Claims, 20 Drawing Sheets

(56) References Cited

OTHER PUBLICATIONS

Intel Corporation: "Discussions on Multi-cell Scheduling with a Single DCI", 3GPP TSG RAN WG1 #109-e, R1-2204816, 3rd Generation Partnership Project, Mobile Competence Centre, 650, Route Des Lucioles, F-06921 Sophia-Antipolis Cedex, France, vol. RAN WG1, No. e-Meeting, May 9, 2022-May 20, 2022, Apr. 30, 2022, pp. 1-12, XP052144077, p. 1, line 2, Para 1, p. 5, lines 13-14, Para 3.4, p. 5, lines 3-4, p. 3, lines 7-12, Para 3.1, p. 4, lines 3-5, p. 1, lines 3-4, Para 2.1, p. 6, lines 8-11, Para 4, p. 9, lines 9-10, Para 6, p. 4, lines 1-2, Para 3.3.
International Search Report and Written Opinion—PCT/US2023/070207—ISA/EPO—Nov. 7, 2023.

\* cited by examiner

UPLINK SHARED CHANNEL RESOURCE ALLOCATION FOR MULTI-CELL SCHEDULING

FIELD OF TECHNOLOGY

The following relates to wireless communications, including uplink shared channel resource allocation for multi-cell scheduling.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

In some wireless communications systems, a network entity may transmit a downlink control information (DCI) message to a UE, or some other receiving device. The DCI message may include resource allocation information indicative of uplink resources for the UE. Techniques for indicating resource allocation information to a UE may be improved.

SUMMARY

The described techniques relate to improved methods, systems, devices, and apparatuses that support uplink shared channel resource allocation for multi-cell scheduling. For example, the described techniques provide for a downlink control information (DCI) message, or some other control message, to indicate resource allocation information to a receiving device (e.g., a user equipment (UE)) indicative of uplink resources available for uplink transmissions by the UE (e.g., physical uplink shared channel (PUSCH) transmissions). The DCI message may indicate that resource allocation Type 2 is applied for scheduling the uplink resources. In some cases, the DCI message (e.g., a single DCI message) may be configured to indicate resource allocation for multiple network entities, cells, etc. In accordance with resource allocation Type 2, the DCI message may include at least two sets of bits, where the first set of bits (e.g., N bits) may indicate scheduled resource blocks, and may be referred to as resource block bits, and the second set of bits (e.g., Y bits) may indicate scheduled resource block sets, and may be referred to as resource block set bits. In some examples, the resource block bits, the resource block set bits, or both, may be common across the multiple network entities, cells, etc. In some other examples, the DCI message may include multiple sets of resource block bits, where each set is associated with a different network entity. Similarly, the DCI message may include multiple sets of resource block set bits, where each set is associated with a different network entity. In some cases, the DCI message may include multiple sets of resource block bits, where each set is associated with a different group of network entities. Similarly, the DCI message may include multiple sets of resource block set bits, where each set is associated with a different group of network entities. Accordingly, the UE may receive the DCI message including one or more sets of resource block bits and one or more sets of resource block set bits and the UE may transmit uplink messages to the multiple network entities in accordance with the resource block bits and resource block set bits.

A method for wireless communications at a UE is described. The method may include receiving a DCI message indicating that uplink shared channel messages to at least a first network entity and a second network entity are scheduled in accordance with a resource allocation type, receiving a first set of bits indicative of one or more resource block indices based on the resource allocation type, receiving a second set of bits indicative of one or more resource block set indices based on the resource allocation type, and transmitting the uplink shared channel messages to at least the first network entity and the second network entity in accordance with the first set of bits and the second set of bits.

An apparatus for wireless communications at a UE is described. The apparatus may include a processor, memory coupled with the processor, and instructions stored in the memory. The instructions may be executable by the processor to cause the apparatus to receive a DCI message indicating that uplink shared channel messages to at least a first network entity and a second network entity are scheduled in accordance with a resource allocation type, receive a first set of bits indicative of one or more resource block indices based on the resource allocation type, receive a second set of bits indicative of one or more resource block set indices based on the resource allocation type, and transmit the uplink shared channel messages to at least the first network entity and the second network entity in accordance with the first set of bits and the second set of bits.

Another apparatus for wireless communications at a UE is described. The apparatus may include means for receiving a DCI message indicating that uplink shared channel messages to at least a first network entity and a second network entity are scheduled in accordance with a resource allocation type, means for receiving a first set of bits indicative of one or more resource block indices based on the resource allocation type, means for receiving a second set of bits indicative of one or more resource block set indices based on the resource allocation type, and means for transmitting the uplink shared channel messages to at least the first network entity and the second network entity in accordance with the first set of bits and the second set of bits.

A non-transitory computer-readable medium storing code for wireless communications at a UE is described. The code may include instructions executable by a processor to receive a DCI message indicating that uplink shared channel messages to at least a first network entity and a second network entity are scheduled in accordance with a resource allocation type, receive a first set of bits indicative of one or more resource block indices based on the resource allocation type, receive a second set of bits indicative of one or more resource block set indices based on the resource allocation type, and transmit the uplink shared channel messages to at least the first network entity and the second network entity in accordance with the first set of bits and the second set of bits.

In some examples of the method, apparatuses, and non-transitory computer-readable medium described herein, receiving the first set of bits may include operations, features, means, or instructions for receiving the first set of bits that may be commonly associated with at least the first network entity and the second network entity, where the one or more resource block indices may be allocated for transmission of the uplink shared channel messages to at least the first network entity and the second network entity.

In some examples of the method, apparatuses, and non-transitory computer-readable medium described herein, an interlace pattern of the one or more resource block indices may be different for the first network entity and the second network entity in accordance with the first set of bits that may be commonly associated with at least the first network entity and the second network entity based on an alignment of a reference point being different for the first network entity and the second network entity, the reference point may be for identifying resource block indices.

In some examples of the method, apparatuses, and non-transitory computer-readable medium described herein, receiving the first set of bits may include operations, features, means, or instructions for receiving the first set of bits including subsets of bits, where each subset of bits may be associated with a different network entity, and where each subset of bits indicates a set of resource block indices associated with a corresponding network entity.

In some examples of the method, apparatuses, and non-transitory computer-readable medium described herein, the subsets of bits includes a first subset of bits associated with the first network entity and a second subset of bits associated with the second network entity based on the first network entity and the second network entity being different network entities.

In some examples of the method, apparatuses, and non-transitory computer-readable medium described herein, the first subset of bits indicates a first set of resource block indices allocated for transmission of the uplink shared channel messages to the first network entity and the second subset of bits indicates a second set of resource block indices allocated for transmission of the uplink shared channel messages to the second network entity.

In some examples of the method, apparatuses, and non-transitory computer-readable medium described herein, a number of the subsets of bits included in the first set of bits may be based on a number of network entities configured to be scheduled by the DCI message.

In some examples of the method, apparatuses, and non-transitory computer-readable medium described herein, receiving the second set of bits may include operations, features, means, or instructions for receiving multiple first sets of bits, where each multiple may be associated with a different network entity, and where each multiple indicates a set of resource block indices associated with a corresponding network entity.

In some examples of the method, apparatuses, and non-transitory computer-readable medium described herein, a number of multiples of the multiple first sets of bits may be based on a number of network entities configured to be scheduled by the DCI message.

In some examples of the method, apparatuses, and non-transitory computer-readable medium described herein, receiving the first set of bits may include operations, features, means, or instructions for receiving the first set of bits including subsets of bits, where each subset of bits may be associated with a different group of one or more network entities, and where each subset of bits indicates a set of resource block indices associated with a corresponding group of network entities.

In some examples of the method, apparatuses, and non-transitory computer-readable medium described herein, a number of subsets of bits included in the first set of bits may be based on a number of groups of network entities configured to be scheduled by the DCI message.

In some examples of the method, apparatuses, and non-transitory computer-readable medium described herein, the first network entity and the second network entity may be included in a same group of network entities or different groups of network entities.

In some examples of the method, apparatuses, and non-transitory computer-readable medium described herein, receiving the second set of bits may include operations, features, means, or instructions for receiving the second set of bits that may be commonly associated with at least the first network entity and the second network entity based on resource block indices being assigned to resource block sets per network entity, where the one or more resource block set indices may be allocated for transmission of the uplink shared channel messages to at least the first network entity and the second network entity.

In some examples of the method, apparatuses, and non-transitory computer-readable medium described herein, a number of bits included in the second set of bits may be based on a network entity of at least the first network entity and the second network entity being associated with a highest number of resource block sets.

In some examples of the method, apparatuses, and non-transitory computer-readable medium described herein, a resource block set configuration associated with the first network entity may be different from a resource block set configuration associated with the second network entity based on intra-cell guard band configurations associated with the respective first and second network entities.

In some examples of the method, apparatuses, and non-transitory computer-readable medium described herein, each resource block set configuration may be indicative of a starting common resource block index and a number of common resource blocks associated with each resource block set, the starting common resource block index, the number of common resource blocks, or both being different for one or more of the resource block sets configured for the first network entity and the second network entity.

In some examples of the method, apparatuses, and non-transitory computer-readable medium described herein, receiving the second set of bits may include operations, features, means, or instructions for receiving the second set of bits including subsets of bits, where each subset of bits may be associated with a different network entity, and where each subset of bits indicates a set of resource block set indices associated with a corresponding network entity.

In some examples of the method, apparatuses, and non-transitory computer-readable medium described herein, the subsets of bits includes a first subset of bits associated with the first network entity and a second subset of bits associated with the second network entity based on the first network entity and the second network entity being different network entities.

In some examples of the method, apparatuses, and non-transitory computer-readable medium described herein, the first subset of bits indicates a first set of resource block indices allocated for transmission of the uplink shared channel messages to the first network entity and the second subset of bits indicates a second set of resource block set indices allocated for transmission of the uplink shared channel messages to the first network entity.

In some examples of the method, apparatuses, and non-transitory computer-readable medium described herein, a number of the subsets of bits included in the first set of bits may be based on a number of network entities configured to be scheduled by the DCI message.

In some examples of the method, apparatuses, and non-transitory computer-readable medium described herein, receiving the second set of bits may include operations, features, means, or instructions for receiving multiple second sets of bits, where each multiple may be associated with a different network entity, and where each multiple indicates a set of resource block set indices associated with a corresponding network entity.

In some examples of the method, apparatuses, and non-transitory computer-readable medium described herein, a number of multiples of the multiple second sets of bits may be based on a number of network entities configured to be scheduled by the DCI message.

In some examples of the method, apparatuses, and non-transitory computer-readable medium described herein, receiving the second set of bits may include operations, features, means, or instructions for receiving the second set of bits including subsets of bits, where each subset of bits may be associated with a different group of one or more network entities, and where each subset of bits indicates a set of resource block indices associated with a corresponding group of network entities.

In some examples of the method, apparatuses, and non-transitory computer-readable medium described herein, a number of subsets of bits included in the second set of bits may be based on a number of groups of network entities configured to be scheduled by the DCI message.

In some examples of the method, apparatuses, and non-transitory computer-readable medium described herein, the first network entity and the second network entity may be included in a same group of network entities or different groups of network entities.

In some examples of the method, apparatuses, and non-transitory computer-readable medium described herein, receiving the second set of bits may include operations, features, means, or instructions for receiving the second set of bits that may be commonly associated with at least the first network entity and the second network entity based on resource block set indices being assigned to resource block sets across at least the first network entity and the second network entity, where each bit in the second set of bits corresponds to a different resource block set index.

In some examples of the method, apparatuses, and non-transitory computer-readable medium described herein, the second set of bits indicates that consecutive resource block sets associated with the first network entity may be scheduled by the DCI message and the method, apparatuses, and non-transitory computer-readable medium may include further operations, features, means, or instructions for identifying that resource blocks between the consecutive resource block sets may be scheduled for the uplink shared channel messages based on the consecutive resource block sets being associated with a same network entity.

In some examples of the method, apparatuses, and non-transitory computer-readable medium described herein, the second set of bits indicates that a first resource block set associated with the first network entity and a consecutive resource block set associated with the second network entity may be scheduled by the DCI message and the method, apparatuses, and non-transitory computer-readable medium may include further operations, features, means, or instructions for identifying that resource blocks between the first resource block set and the consecutive resource block set may be unscheduled for the uplink shared channel messages based on the first resource block set and the consecutive resource block set being associated with different network entities.

In some examples of the method, apparatuses, and non-transitory computer-readable medium described herein, a number of bits included in the second set of bits may be based on a number of resource block sets allocated across at least the first network entity and the second network entity.

In some examples of the method, apparatuses, and non-transitory computer-readable medium described herein, receiving the first set of bits and the second set of bits may include operations, features, means, or instructions for receiving a message including the first set of bits and the second set of bits.

In some examples of the method, apparatuses, and non-transitory computer-readable medium described herein, the message may be the DCI message.

In some examples of the method, apparatuses, and non-transitory computer-readable medium described herein, a format of the DCI message may be based on the DCI message scheduling the uplink shared channel messages to at least the first network entity and the second network entity in accordance with the resource allocation type.

In some examples of the method, apparatuses, and non-transitory computer-readable medium described herein, a number of bits included in the first set of bits may be based on a subcarrier spacing associated with the one or more resource blocks.

A method for wireless communications at a first network entity is described. The method may include transmitting a DCI message indicating that uplink shared channel messages to at least the first network entity and a second network entity are scheduled in accordance with a resource allocation type, transmitting a first set of bits indicative of one or more resource block indices based on the resource allocation type, transmitting a second set of bits indicative of one or more resource block set indices based on the resource allocation type, and receiving the uplink shared channel messages in accordance with the first set of bits and the second set of bits.

An apparatus for wireless communications at a first network entity is described. The apparatus may include a processor, memory coupled with the processor, and instructions stored in the memory. The instructions may be executable by the processor to cause the apparatus to transmit a DCI message indicating that uplink shared channel messages to at least the first network entity and a second network entity are scheduled in accordance with a resource allocation type, transmit a first set of bits indicative of one or more resource block indices based on the resource allocation type, transmit a second set of bits indicative of one or more resource block set indices based on the resource allocation type, and receive the uplink shared channel messages in accordance with the first set of bits and the second set of bits.

Another apparatus for wireless communications at a first network entity is described. The apparatus may include means for transmitting a DCI message indicating that uplink shared channel messages to at least the first network entity and a second network entity are scheduled in accordance with a resource allocation type, means for transmitting a first set of bits indicative of one or more resource block indices based on the resource allocation type, means for transmitting a second set of bits indicative of one or more resource block set indices based on the resource allocation type, and means for receiving the uplink shared channel messages in accordance with the first set of bits and the second set of bits.

A non-transitory computer-readable medium storing code for wireless communications at a first network entity is described. The code may include instructions executable by a processor to transmit a DCI message indicating that uplink shared channel messages to at least the first network entity and a second network entity are scheduled in accordance with a resource allocation type, transmit a first set of bits indicative of one or more resource block indices based on the resource allocation type, transmit a second set of bits indicative of one or more resource block set indices based on the resource allocation type, and receive the uplink shared channel messages in accordance with the first set of bits and the second set of bits.

In some examples of the method, apparatuses, and non-transitory computer-readable medium described herein, transmitting the first set of bits may include operations, features, means, or instructions for transmitting the first set of bits that may be commonly associated with at least the first network entity and the second network entity, where the one or more resource block indices may be allocated for transmission of the uplink shared channel messages to at least the first network entity and the second network entity.

In some examples of the method, apparatuses, and non-transitory computer-readable medium described herein, an interlace pattern of the one or more resource block indices may be different for the first network entity and the second network entity in accordance with the first set of bits that may be commonly associated with at least the first network entity and the second network entity based on an alignment of a reference point being different for the first network entity and the second network entity, the reference point may be for identifying resource block indices.

In some examples of the method, apparatuses, and non-transitory computer-readable medium described herein, transmitting the first set of bits may include operations, features, means, or instructions for transmitting the first set of bits including subsets of bits, where each subset of bits may be associated with a different network entity, and where each subset of bits indicates a set of resource block indices associated with a corresponding network entity.

In some examples of the method, apparatuses, and non-transitory computer-readable medium described herein, the subsets of bits includes a first subset of bits associated with the first network entity and a second subset of bits associated with the second network entity based on the first network entity and the second network entity being different network entities.

In some examples of the method, apparatuses, and non-transitory computer-readable medium described herein, the first subset of bits indicates a first set of resource block indices allocated for transmission of the uplink shared channel messages to the first network entity and the second subset of bits indicates a second set of resource block indices allocated for transmission of the uplink shared channel messages to the second network entity.

In some examples of the method, apparatuses, and non-transitory computer-readable medium described herein, a number of the subsets of bits included in the first set of bits may be based on a number of network entities configured to be scheduled by the DCI message.

In some examples of the method, apparatuses, and non-transitory computer-readable medium described herein, transmitting the first set of bits may include operations, features, means, or instructions for transmitting multiple first sets of bits, where each multiple may be associated with a different network entity, and where each multiple indicates a set of resource block indices associated with a corresponding network entity.

In some examples of the method, apparatuses, and non-transitory computer-readable medium described herein, a number of multiples of the multiple first sets of bits may be based on a number of network entities configured to be scheduled by the DCI message.

In some examples of the method, apparatuses, and non-transitory computer-readable medium described herein, transmitting the first set of bits may include operations, features, means, or instructions for transmitting the first set of bits including subsets of bits, where each subset of bits may be associated with a different group of one or more network entities, and where each subset of bits indicates a set of resource block indices associated with a corresponding group of network entities.

In some examples of the method, apparatuses, and non-transitory computer-readable medium described herein, a number of subsets of bits included in the first set of bits may be based on a number of groups of network entities configured to be scheduled by the DCI message.

In some examples of the method, apparatuses, and non-transitory computer-readable medium described herein, the first network entity and the second network entity may be included in a same group of network entities or different groups of network entities.

In some examples of the method, apparatuses, and non-transitory computer-readable medium described herein, transmitting the second set of bits may include operations, features, means, or instructions for transmitting the second set of bits that may be commonly associated with at least the first network entity and the second network entity based on resource block indices being assigned to resource block sets per network entity, where the one or more resource block set indices may be allocated for transmission of the uplink shared channel messages to at least the first network entity and the second network entity.

In some examples of the method, apparatuses, and non-transitory computer-readable medium described herein, a number of bits included in the second set of bits may be based on a network entity of at least the first network entity and the second network entity being associated with a highest number of resource block sets.

In some examples of the method, apparatuses, and non-transitory computer-readable medium described herein, a resource block set configuration associated with the first network entity may be different from a resource block set configuration associated with the second network entity based on intra-cell guard band configurations associated with the respective first and second network entities.

In some examples of the method, apparatuses, and non-transitory computer-readable medium described herein, each resource block set configuration may be indicative of a starting common resource block index and a number of common resource blocks associated with each resource block set, the starting common resource block index, the number of common resource blocks, or both being different for one or more of the resource block sets configured for the first network entity and the second network entity.

In some examples of the method, apparatuses, and non-transitory computer-readable medium described herein, transmitting the second set of bits may include operations, features, means, or instructions for transmitting the second set of bits including subsets of bits, where each subset of bits may be associated with a different network entity, and where each subset of bits indicates a set of resource block set indices associated with a corresponding network entity.

In some examples of the method, apparatuses, and non-transitory computer-readable medium described herein, the subsets of bits includes a first subset of bits associated with the first network entity and a second subset of bits associated with the second network entity based on the first network entity and the second network entity being different network entities.

In some examples of the method, apparatuses, and non-transitory computer-readable medium described herein, the first subset of bits indicates a first set of resource block set indices allocated for transmission of the uplink shared channel messages to the first network entity and the second subset of bits indicates a second set of resource block set indices allocated for transmission of the uplink shared channel messages to the first network entity.

In some examples of the method, apparatuses, and non-transitory computer-readable medium described herein, a number of the subsets of bits included in the first set of bits may be based on a number of network entities configured to be scheduled by the DCI message.

In some examples of the method, apparatuses, and non-transitory computer-readable medium described herein, transmitting the second set of bits may include operations, features, means, or instructions for transmitting multiple second sets of bits, where each multiple may be associated with a different network entity, and where each multiple indicates a set of resource block set indices associated with a corresponding network entity.

In some examples of the method, apparatuses, and non-transitory computer-readable medium described herein, a number of multiples of the multiple second sets of bits may be based on a number of network entities configured to be scheduled by the DCI message.

In some examples of the method, apparatuses, and non-transitory computer-readable medium described herein, transmitting the second set of bits may include operations, features, means, or instructions for transmitting the second set of bits including subsets of bits, where each subset of bits may be associated with a different group of one or more network entities, and where each subset of bits indicates a set of resource block indices associated with a corresponding group of network entities.

In some examples of the method, apparatuses, and non-transitory computer-readable medium described herein, a number of subsets of bits included in the second set of bits may be based on a number of groups of network entities configured to be scheduled by the DCI message.

In some examples of the method, apparatuses, and non-transitory computer-readable medium described herein, the first network entity and the second network entity may be included in a same group of network entities or different groups of network entities.

In some examples of the method, apparatuses, and non-transitory computer-readable medium described herein, transmitting the second set of bits may include operations, features, means, or instructions for transmitting the second set of bits that may be commonly associated with at least the first network entity and the second network entity based on resource block set indices being assigned to resource block sets across at least the first network entity and the second network entity, where each bit in the second set of bits corresponds to a different resource block set index.

In some examples of the method, apparatuses, and non-transitory computer-readable medium described herein, the second set of bits indicates that consecutive resource block sets associated with the first network entity may be scheduled by the DCI message and the method, apparatuses, and non-transitory computer-readable medium may include further operations, features, means, or instructions for identifying that resource blocks between the consecutive resource block sets may be scheduled for the uplink shared channel messages based on the consecutive resource block sets being associated with a same network entity.

In some examples of the method, apparatuses, and non-transitory computer-readable medium described herein, the second set of bits indicates that a first resource block set associated with the first network entity and a consecutive resource block set associated with the second network entity may be scheduled by the DCI message and the method, apparatuses, and non-transitory computer-readable medium may include further operations, features, means, or instructions for identifying that resource blocks between the first resource block set and the consecutive resource block set may be unscheduled for the uplink shared channel messages based on the first resource block set and the consecutive resource block set being associated with different network entities.

In some examples of the method, apparatuses, and non-transitory computer-readable medium described herein, a number of bits included in the second set of bits may be based on a number of resource block sets allocated across at least the first network entity and the second network entity.

In some examples of the method, apparatuses, and non-transitory computer-readable medium described herein, transmitting the first set of bits and the second set of bits may include operations, features, means, or instructions for transmitting a message including the first set of bits and the second set of bits.

In some examples of the method, apparatuses, and non-transitory computer-readable medium described herein, the message may be the DCI message.

In some examples of the method, apparatuses, and non-transitory computer-readable medium described herein, a format of the DCI message may be based on the DCI message scheduling the uplink shared channel messages to at least the first network entity and the second network entity in accordance with the resource allocation type.

In some examples of the method, apparatuses, and non-transitory computer-readable medium described herein, a number of bits included in the first set of bits may be based on a subcarrier spacing associated with the one or more resource blocks.

DETAILED DESCRIPTION

Figure 1:
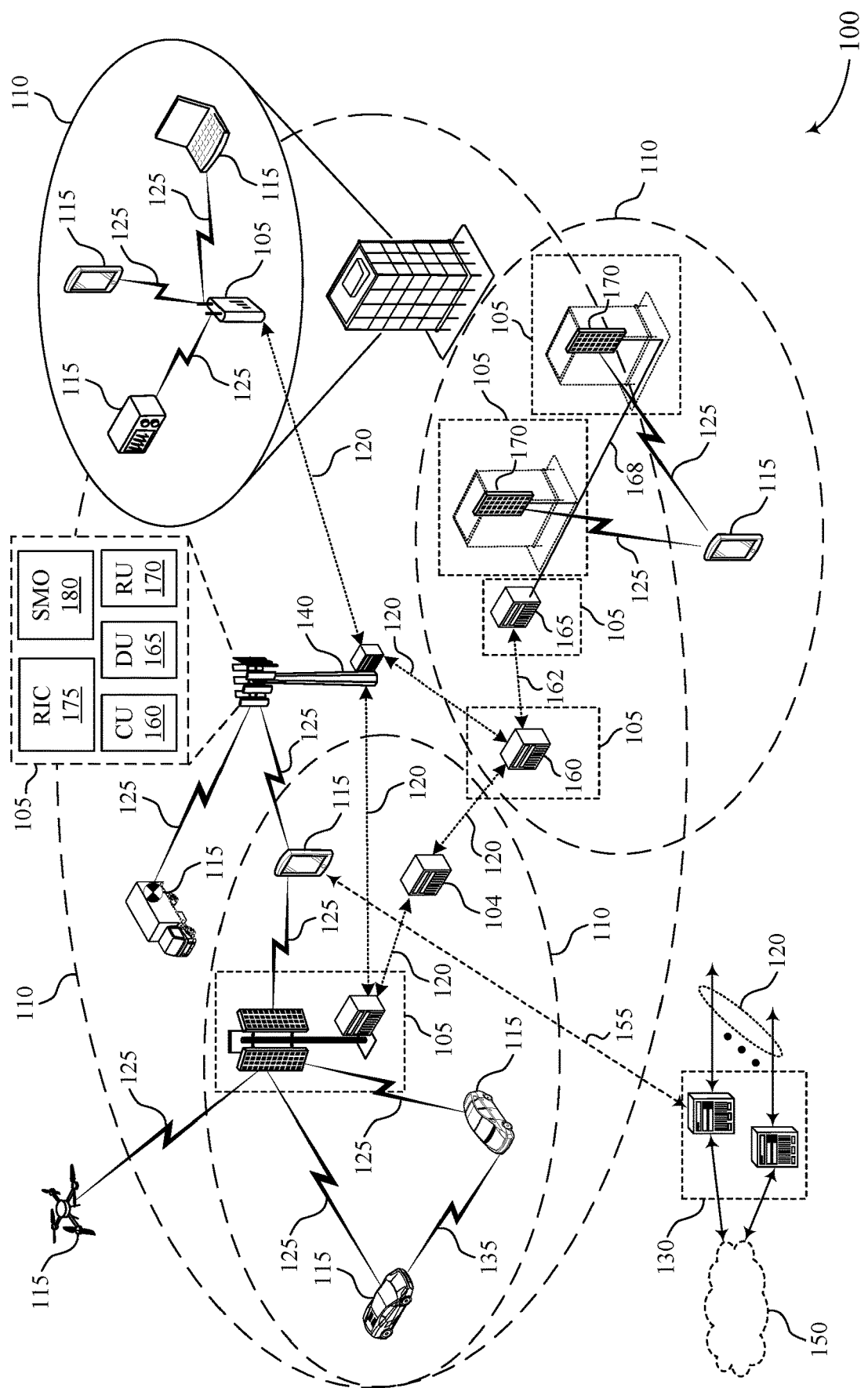
FIG. 1 illustrates an example of a wireless communications system that supports uplink shared channel resource allocation for multi-cell scheduling in accordance with one or more aspects of the present disclosure.

In some wireless communications systems, one or more frequency domain resource allocation (FDRA) types (e.g., 0, 1, 2) may be employed to indicate available (e.g., scheduled) resources to a receiving device (e.g., a user equipment (UE)). For example, in Type 0, an FDRA field in a scheduling downlink control information (DCI) message may be a bit map indicating the scheduling of resource block groups. In accordance with Type 1, the FDRA field in the scheduling DCI may be a resource indication value (RIV) field indicative of a starting resource block and a number of consecutive resource blocks scheduled by the DCI. Type 2 FDRA may allocate resources by utilizing interlaced resource blocks to enable wideband transmission, which may allow for fewer allocated resource blocks. The FDRA field, in accordance with Type 2, may include a first set of bits (e.g., N bits) indicating scheduled resource blocks and may include a second set of bits (e.g., Y bits) indicating scheduled resource block sets. In some examples, a single DCI may indicate scheduling information, such as uplink shared channel scheduling information, applicable by a UE for multiple network entities, cells, etc. Techniques for indicating scheduling information, such resource allocation Type 2 information, applicable across multiple network entities may be improved.

The techniques described herein may be implemented to support a single DCI configured to indicate resource allocation information across multiple network entities (e.g., cells). In cases of FDRA Type 2, the DCI message may include one or more FDRA fields that may include at least two sets of bits, where the first set of bits (e.g., N bits) may indicate scheduled resource blocks, and may be referred to as resource block bits, and the second set of bits (e.g., Y bits) may indicate scheduled resource block sets, and may be referred to as resource block set bits. The resource block bits and the resource block set bits may be included in a single DCI indicative of resource allocation information applicable across multiple network entities in accordance with FDRA Type 2, where the FDRA field of the DCI may indicate the resource allocation type (e.g., FRDA Type 0, 1, 2). In some examples, the resource block bits, the resource block set bits, or both, may be common across the multiple network entities, such that a single set of the resource block bits, a single set of resource block set bits, or both may be applicable across the multiple network entities. In some other examples, the DCI message (e.g., the FDRA field of the DCI) may include multiple sets of resource block bits, where each set may be associated with a different network entity. Similarly, the DCI message may include multiple sets of resource block set bits, where each set may be associated with a different network entity. In some cases, the FDRA field may include multiple sets of resource block bits, where each set may be associated with a different group of one or more network entities. Similarly, the FDRA field may include multiple sets of resource block set bits, where each set may be associated with a different group of network entities. For example, network entities may be grouped based on similar resource grid alignment, resource block indexing, etc. and accordingly, different groups may be allocated different resource allocations. Accordingly, the UE may receive the FDRA field including one or more sets of resource block bits and one or more sets of resource block set bits and may transmit uplink shared messages to the multiple network entities in accordance with the resource block bits and resource block set bits.

Particular aspects of the subject matter described herein may be implemented to realize one or more advantages. The described techniques may support improvements for resource allocation by decreasing signaling overhead, improving reliability, increasing UE signaling flexibility, and decreasing latency, among other advantages. As such, supported techniques may include improved network operations and, in some examples, may promote network efficiencies, among other benefits.

Aspects of the disclosure are initially described in the context of wireless communications systems. Aspects of the disclosure are further illustrated by and described with reference to resource allocation diagrams and a process flow diagram. Aspects of the disclosure are further illustrated by and described with reference to apparatus diagrams, system diagrams, and flowcharts that relate to uplink shared channel resource allocation for multi-cell scheduling.

FIG. 1 illustrates an example of a wireless communications system 100 that supports uplink shared channel resource allocation for multi-cell scheduling in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125

(e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support uplink shared channel resource allocation for multi-cell scheduling as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, MC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MIME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In some implementations, a network entity 105 may allocate resources to another device (e.g., a UE 115, some other network device), such as time resources, frequency resources, spatial resources, etc. To allocate resources to a device, the network entity 105 may transmit a DCI message including one or more FDRA fields indicative of the frequency resources allocated for the receiving device. In some cases, the DCI field may indicate resource blocks, and/or resource block sets that are scheduled. A resource block may refer to a time and frequency resource that occupies 12 subcarriers (e.g., 12×15 kHz=180 kHz) and one slot=0.5 ms. A resource block set may refer to any number of resource blocks grouped as a set. A physical resource block index may be assigned per downlink bandwidth part. Physical resource blocks and common resource blocks may be associated with particular subcarrier spacings.

In some cases, a network entity 105 may allocate frequency resources in accordance with different FDRA types, where the different types are associated with different techniques for indicating resource allocations to the receiving device. Examples of FDRA types may include Type 0, Type 1, and Type 2. A field (e.g., 1 bit) of the DCI message may indicate which FDRA type being used for resource scheduling. The DCI may support dynamic switching between Type 0 and Type 1.

If the network entity 105 indicates FDRA Type 0, the FDRA field of the scheduling DCI may be or include a bit-map field indicative of whether a resource block group (RBG) is scheduled or not. The RBG size may depend on the bandwidth of the bandwidth part. For example, an RBG on the edge of a bandwidth part may have fewer resource blocks.

If the network entity 105 indicates FDRA Type 1, the FDRA field of the scheduling DCI may be a resource indication value (RIV) field. Each codepoint of the RIV field may be associated with a starting resource block and a number of resource blocks consecutively scheduled from the starting resource block. In some examples, a similar mechanism may be used to allocate resources for resource block groups (e.g., 2, 4, 5, 16 resource block granularity). In some cases, the network entity 105 may support dynamic switching between Type 0 and Type 1. A bit in the DCI, or some other message, may indicate which resource allocation type is being used for scheduling.

FDRA Type 2 may allocate resources, such as resources for uplink shared channel messages (e.g., physical uplink shared channels (PUSCHs)) using interlaced resource blocks. Interlacing resource blocks may enable wideband transmission while reducing the number of allocated resource blocks. Type 2 may be applied in various wireless systems (e.g., NR-Unlicensed). Interlaces may be described by an interlace index (e.g., m=0, m=1, etc.) The number of interlaces may be based on subcarrier spacing. For example, a network entity 105 may allocate five interlaces for a subcarrier spacing of 30 kHz and ten interlaces for a subcarrier spacing of 15 kHz. A physical uplink shared channel (PUSCH) may be mapped to one or more resource blocks in one or more multiple resource block sets. A grid for resource block sets may be specified based on a control resource block (CRB).

The FDRA field, in accordance with Type 2, may include a first set of bits (e.g., N bits) indicating scheduled resource blocks (e.g., resource block bits) and may include a second set of bits (e.g., Y bits) indicating scheduled resource block sets (e.g., resource block set bits). In some examples, different quantities of bits may indicate different resource block options and may be based on subcarrier spacing. For example, the resource block bits may include five bits for a subcarrier spacing of 30 kHz and may indicate a bit-map of resource blocks in each resource block set. In another example, the resource block bits may include six bits and may indicate a start resource block and a length of resource blocks in each resource block set.

In some cases, the resource block set bits may be based on a DCI format. The resource block set bits may be fixed to zero, such as in the example of DCI format 0_0 in a common search space (CSS), and/or in the scheduling of one resource block set. The resource block set bits may be included in multiple DCI formats (e.g., 0_0, 0_1). In some examples, such as in a UE specified search space (USS), the resource block set bits may be based on the number of resource block sets per downlink bandwidth part and may indicate a starting resource block set and a length of the resource block sets in the downlink bandwidth part. A grid of resource block sets and the index of interlaces may be defined in a control resource block (CRB) number, and, in some examples, may not be dependent on where the downlink bandwidth part begins.

Techniques for indicating resource allocation in a DCI message may be improved. For example, in some cases, a single DCI may be used to schedule multiple cells, network entities 105, network nodes, etc. Accordingly, the techniques described herein support a DCI message capable of the allocating resources in accordance with FDRA Type 2 for PUSCH messages transmitted across multiple cells, network entities, etc.

In accordance with techniques described herein, the FDRA field may include at least two sets of bits, where the first set of bits (e.g., N bits) may indicate scheduled resource blocks, and may be referred to as resource block bits, and the second set of bits (e.g., Y bits) may indicate scheduled resource block sets, and may be referred to as resource block set bits. The resource block bits and the resource block set bits may be included in a single DCI and may be applicable across multiple network entities 105, where the FDRA field of the DCI may indicate the resource allocation type (e.g., Type 2). In some examples, the resource block bits, the resource block set bits, or both, may be common across the multiple network entities. In some other examples, the FDRA field may include multiple sets of resource block bits, where each set may be associated with a different network entity 105. Similarly, the FDRA field may include multiple sets of resource block set bits, where each set may be associated with a different network entity 105. In some cases, the FDRA field may include multiple sets of resource block bits, where each set is associated with a different group of network entities 105. Similarly, the FDRA field may include multiple sets of resource block set bits, where each set is associated with a different group of network entities 105. Similarly, Accordingly, the UE 115 may receive the FDRA field including one or more sets of resource block bits and one or more sets of resource block set bits and the UE 115 may transmit uplink shared messages to the multiple network entities 105 in accordance with the resource block bits and resource block set bits.

Figure 2:
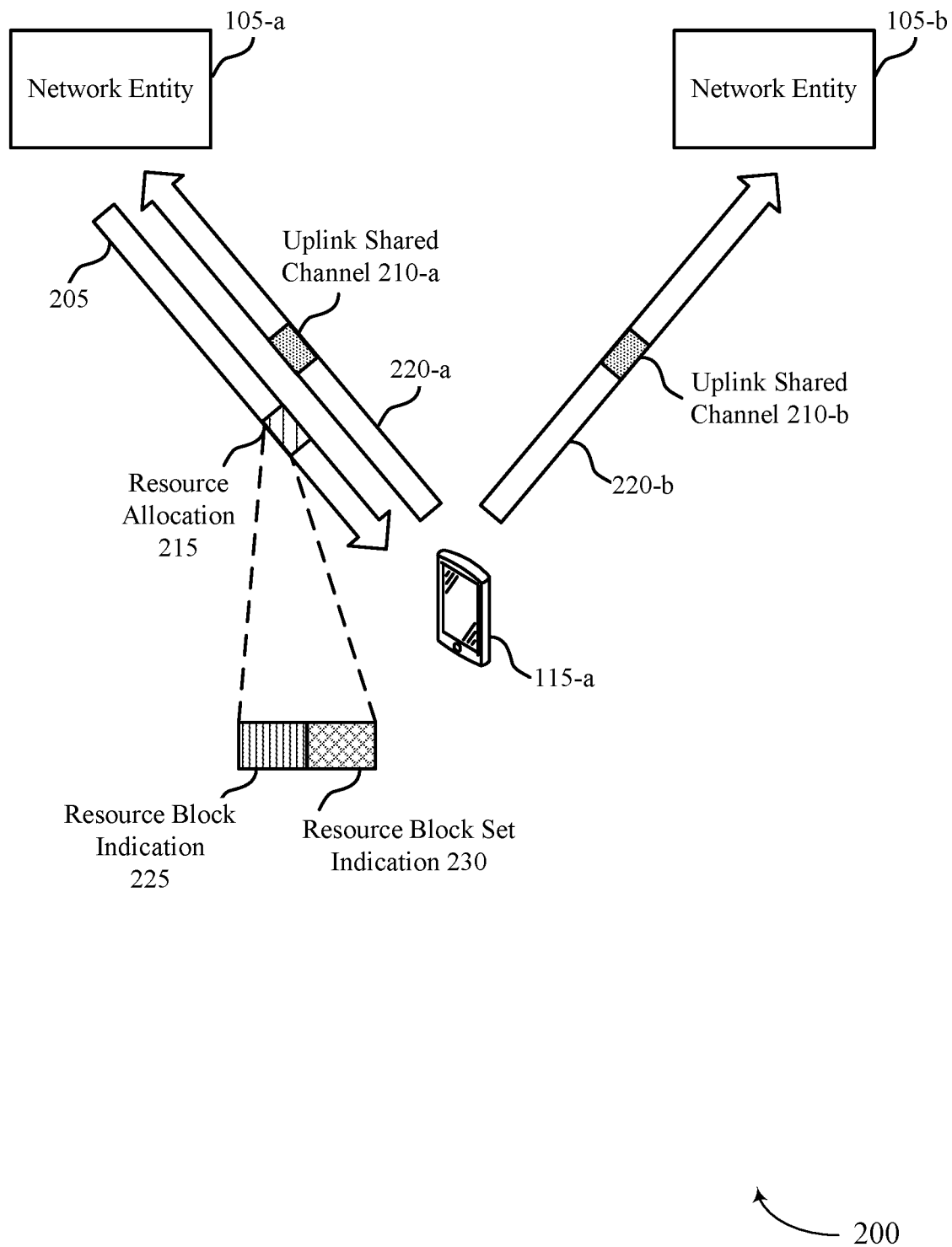
FIG. 2 illustrates an example of a wireless communications system that supports uplink shared channel resource allocation for multi-cell scheduling in accordance with one or more aspects of the present disclosure.

FIG. 2 illustrates an example of a wireless communication system 200 that supports uplink shared channel resource allocation for multi-cell scheduling in accordance with one or more aspects of the present disclosure. Wireless communications system 200 describes the communications between a UE 115-a and a network entity 105-a, and the UE 115-a and a network entity 105-b. The UE 115-a may be an example of the UE 115 as described with reference to FIG. 1, and the network entity 105-a and the network entity 105-b may be examples of the network entities 105 as described with reference to FIG. 1. In some examples, the network entity 105-a and the network entity 105-b may include one or more cells, and the cells may be served by the network entities 105. In some cases, the terms network entity 105 and cell as described herein may be used interchangeably. The UE 115-a may communicate with the network entity 105-a via downlink 205 (e.g., a communications link, channel, beam) and uplink 220-a (e.g., a communications link, channel, beam), and communicate with the network entity 105-b via at least uplink 220-b.

In some cases, a network entity 105 may transmit a single DCI to schedule multiple cells, network entities 105, network nodes, etc. As described with reference to FIG. 1, the techniques described herein support a DCI message capable of allocating resources in accordance with an FDRA type (e.g., FDRA Type 2) for PUSCH messages transmitted across multiple cells, network entities 105, etc. For example, the network entity 105-a may transmit a resource allocation 215 to the UE 115-a, and the resource allocation 215 may include a resource block indication 225 and a resource block set indication 230. The UE 115-a may transmit the uplink shared channel 210-a to the network entity 105-a via the uplink 220-a, and may transmit the uplink shared channel 210-b to the network entity 105-b via the uplink 220-b in accordance with resource allocation 215.

In some cases, the network entity 105-a may include the resource allocation 215 in one message or across multiple messages, such as a DCI message. The resource allocation 215 may include the resource block indication 225, the resource block set indication 230, an indication of a FDRA format, or a combination thereof. For example, the resource allocation 215 may indicate, as part of the DCI message, the FDRA type applied to the scheduling, such as FDRA Type 2. The resource block indication 225 may be referred to as resource block bits (e.g., N bits, first set of bits), and the resource block set indication 230 may be referred to as resource block set bits (e.g., Y bits, second set of bits). In some cases, a receiving device, such as a UE 115-a, may identify the type of FDRA being applied based on message from a network entity 105 (e.g., RRC message, MAC-CE message, DCI message, resource allocation 215). In some cases, the receiving device may implicitly identify the type of FDRA being applied based on a format of resource allocation 215.

In some cases, an existing DCI format may be used to support a single DCI indicative of resource allocation for uplink shared channel messages across cells, network entities 105, etc. in accordance with FDRA Type 2. In some cases, a DCI format (e.g., a new DCI format, DCI format 0_X) may be configured (e.g., preconfigured, configured by the network entity 105-a) to support a single DCI indicative of resource allocation for uplink shared channel messages across cells, network entities 105, etc. in accordance with FDRA Type 2. For example, a DCI format 0_X may indicate the FDRA format, the resource block indication 225, the resource block set indication 230, or a combination thereof.

The resource block indication 225 may be common, separate, or a combination thereof, for a group of physical uplink shared channels (PUSCHs), such as one or more PUSCHs that may be transmitted to one or more network entities 105. In some examples, the resource block indication 225 may be common for, or shared by, a group of PUSCHs that may be scheduled by the DCI format 0_X. For example, the UE 115-*a* may receive the resource allocation 215 that may schedule one or more PUSCHs (e.g., uplink shared channel 210-*a* to network entity 105-*a*, uplink shared channel 210-*b* to network entity 105-*b*) with a common resource block indication 225. The common resource block indication 225 may include a single set of bits, where the set of bits may be commonly applicable for the uplink shared channel 210-*a* to network entity 105-*a* and to uplink shared channel 210-*b* to network entity 105-*b*. The UE 115-*a* may then transmit the uplink shared channel 210-*a* and the uplink shared channel 210-*b* to the network entity 105-*a* and the network entity 105-*b*, respectively, using the same resource block indication 225. The number of bits included in the resource block indication 225 may be based on subcarrier spacing. For example, the resource block indication 225 may include five bits for subcarrier spacing of 30 kHz and six bits for subcarrier spacing of 15 kHz.

In some other examples, the resource block indication 225 may be separate for each PUSCH of a group of PUSCHs for one or more cells that may be scheduled by the DCI message. The UE 115-*a* may be configured with Type 2 resource allocation, and may monitor for DCI format 0_X, or some other DCI format, for PUSCH scheduling. In some examples, the resource allocation 215 may indicate that a DCI format 0_X includes the resource block indication 225 for interlaced resource block indication. In accordance with separate indication, the resource block indication 225 field may include a set of bits that may be divided into subsets of bits, where each subset is associated with a particular PUSCH (e.g., cell, network entity 105). If the resource block indication 225 field is divided into subsets of bits for each PUSCH, each subset may be the same or different (e.g., same or different quantity of bits per subset, same or different bit values). In some cases, the resource block indication 225 may include multiple set of bits, or the resource allocation 215 may include multiple resource block indications 225, such that each resource block indication 225 or each set of bits may be assigned to a particular PUSCH (e.g., cell, network entity 105). If a set of bits or the resource block indication 225 is applied per PUSCH, each resource block indication 225 per cell may be the same or different. Accordingly, the DCI message (e.g., DCI format 0_X) may include X*N bits for interlaced resource block indication for the X cells scheduled by the DCI. For example, N may be equal to five in the case of 30 kHz subcarrier spacing, and in the case that two network entities 105 are scheduled by the DCI, the resource allocation 215 may include ten bits for resource block indications (e.g., five bits for a first network entity 105 and the remaining five bits for the second network entity 105).

In some other examples, the resource block indication 225 may be a combination of common and separate for a group of PUSCHs scheduled by the DCI message. For example, network entities 105, cells, PUSCHs, etc. may be grouped based on similar resource grid alignment, resource block indexing, etc. and accordingly, different groups may be allocated different resources. For example, the DCI message may include multiple resource block indications 225, or the resource block indication 225 may include multiple sets of bits (e.g., multiple of N bits). Each resource block indication 225, or each set of bits, respectively, may be for a sub-group of one or more PUSCHs that may be scheduled by the DCI message. Accordingly, network entities 105, cells, PUSCHs, etc. included in a group may be scheduled with common resource block bits, but different groups may be scheduled with different resource block bits.

The resource block set indication 230 and the corresponding indices may be defined per cell or over multiple cells. For example, resource block set indices may be assigned to resource block sets per cell. In some examples, the resource block set indication 230 may be defined, or identified, per cell. In such cases, the resource block set indication 230 may be common for a group of one or more PUSCHs that may be scheduled by the DCI message. For example, the DCI message may indicate that one or more resource block sets are scheduled, and as the resource block set indication 230 is common, the one or more scheduled resource block sets are applicable for each PUSCHs indicated by the DCI message. If the DCI message indicates that a first resource block set is scheduled, then the first resource block set in all the cells scheduled by the DCI are also scheduled. The number of bits included in the resource block set indication 230 is determined based on the cell or downlink bandwidth part that has the largest number of resource block sets over multiple cells.

In some examples, the DCI message may include separate resource block set indications 230 for each PUSCH from a group of PUSCHs that may be scheduled by the DCI. The resource block set indication 230 field may be divided into subsets of bits for each PUSCH, or a full resource block set indication 230 may be assigned per PUSCH. If the resource block set indication 230 field is divided into subsets of bits for each PUSCH, each subset may be the same or different. If the resource block set indication 230 is applied per PUSCH, each resource block set indication 230 per cell may be the same or different.

In some other examples, the resource block set indication 230 may be a combination of common and separate for a group of PUSCHs scheduled by the DCI. For example, network entities 105, cells, PUSCHs, etc. may be grouped based on similar resource grid alignment, resource block indexing, etc. and accordingly, different groups may be allocated different resources. For example, the DCI message may include multiple resource block set indications 230, or the resource block set indication 230 may include multiple sets of bits (e.g., multiple of Y bits). Each resource block set indication 230, or each set of bits, respectively, may be for a sub-group of one or more PUSCHs that may be scheduled by the DCI message based on groupings. Accordingly, network entities 105, cells, PUSCHs etc. included in a group may be scheduled with common resource block set bits, but different groups may be scheduled with different resource block set bits.

In some implementations, the resource block set indication 230 and the corresponding indices may be defined, or identified, over multiple cells. The resource block set indication 230 may be common for a group of PUSCHs scheduled by the DCI message. In some examples, the number of bits included in the resource block set indication 230 may be based on the number of resource blocks across the multiple network entities (e.g., cells). If the resource allocation 215 schedules multiple consecutive resource blocks for the same network entity 105, such as network entity 105-*a*, interlaced resource blocks in an intra-cell guard band may also be scheduled, as described in more detail with reference to FIG. 6. If the resource allocation 215 schedules multiple consecutive resource blocks across multiple cells, such as network entity 105-*a* and the network entity 105-*b*, resource blocks between the two cells may not be scheduled, as described in more detail with reference to FIG. 7.

The techniques described herein for allocating resource blocks and resource block sets for PUSCHs across multiple cells, network entities, etc. may be used in any combination. For example, the resource allocation 215 may include common resource block bits applicable to the multiple network entities 105 and may include separate resource block set bits for each network entity 105. In another example, the resource allocation 215 may include common resource block bits applicable to the multiple network entities 105 and common resource block set bits applicable to the multiple network entities 105.

Figure 3:
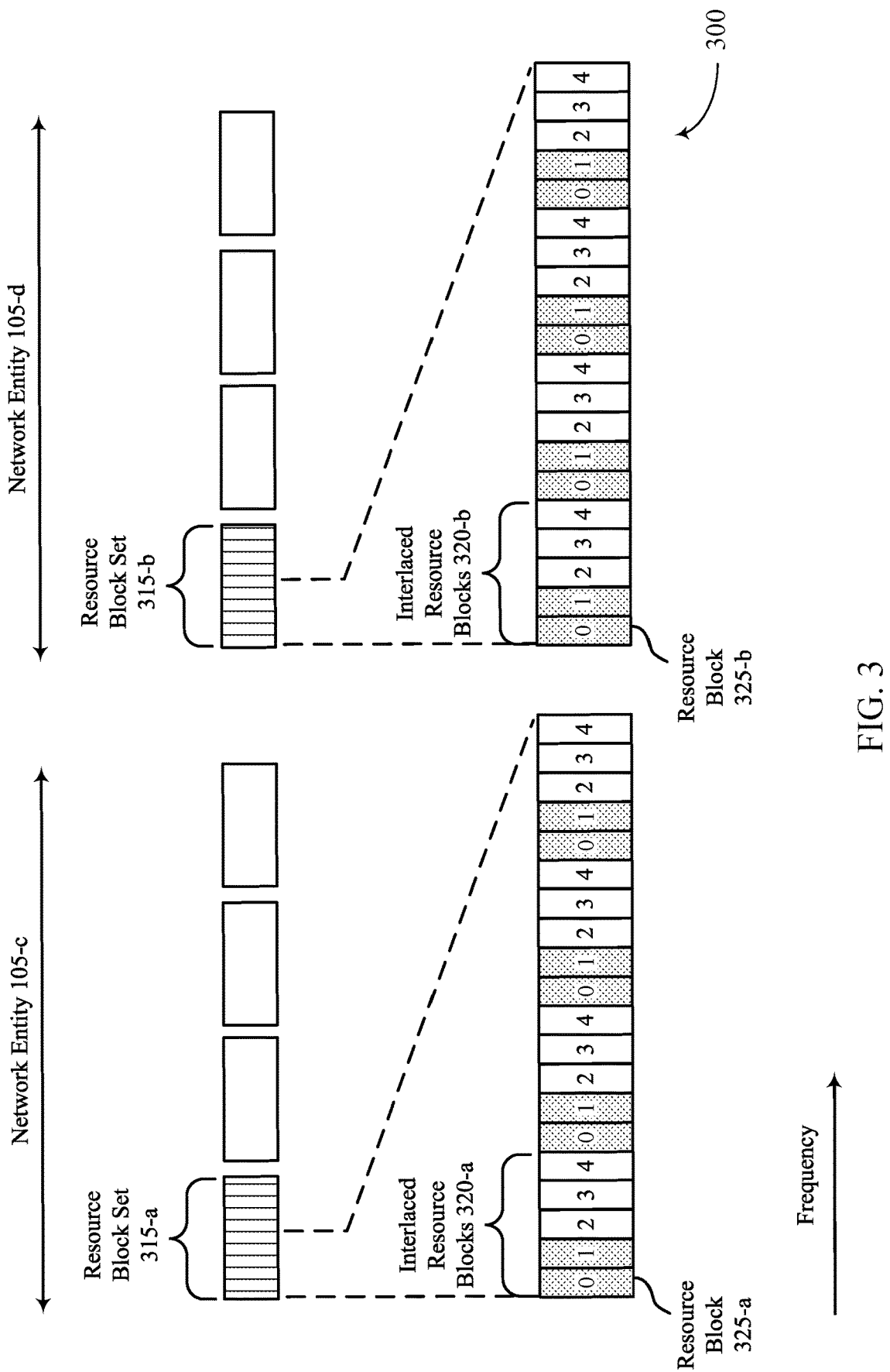
FIGS. 3 through 7 illustrate examples of resource allocation diagrams that support uplink shared channel resource allocation for multi-cell scheduling in accordance with one or more aspects of the present disclosure.

FIG. 3 illustrates an example of a resource allocation diagram 300 that supports uplink shared channel resource allocation for multi-cell scheduling in accordance with one or more aspects of the present disclosure. The resource allocation diagrams 300 may be implemented by network entities 105, UEs 115, or other devices described with reference to FIGS. 1 and 2. In accordance with resource allocation diagram 300, one or more common sets of resource block bits may be scheduled for multiple cells, network entities, PUSCHs, etc. such as a network entity 105-c and a network entity 105-d. The network entity 105-c and the network entity 105-d may be examples of the network entity 105 as described with reference to FIGS. 1 and 2.

The network entity 105-c may have one or more resource block sets, such as resource block set 315-a, and the network entity 105-d may have one or more resource block sets, such as the resource block set 315-d. The resource block set 315-a may include one or more interlaced resource blocks, such as the interlaced resource blocks 320-a, which may include resource blocks, such as resource block 325-a. Similarly, the resource block set 315-b may include one or more interlaced resource blocks, such as the interlaced resource blocks 320-b, which may include one or more resource blocks, such as the resource block 325-b.

A UE may be configured with FDRA Type 2 for scheduling one or more PUSCHs associated with multiple cells. The UE may monitor for a DCI message (e.g., a DCI format 0_X) for PUSCH scheduling. The DCI message may include common resource block bits for interlaced resource blocks 320-a and interlaced resource blocks 320-b for the different network entities (e.g., the network entity 105-c and the network entity 105-d). Thus, the resource block bits may be common for a group of PUSCHs that are scheduled by the DCI message for network entity 105-c and network entity 1050-d. The common resource block bits may indicate the PUSCHs are scheduled on interlaces using an interlace index (e.g., m=0, m=1, etc.). For example, the common resource set bits may indicate resource blocks indices 0 and 1 are scheduled for network entity 105-c and network entity 105-d.

Figure 4:
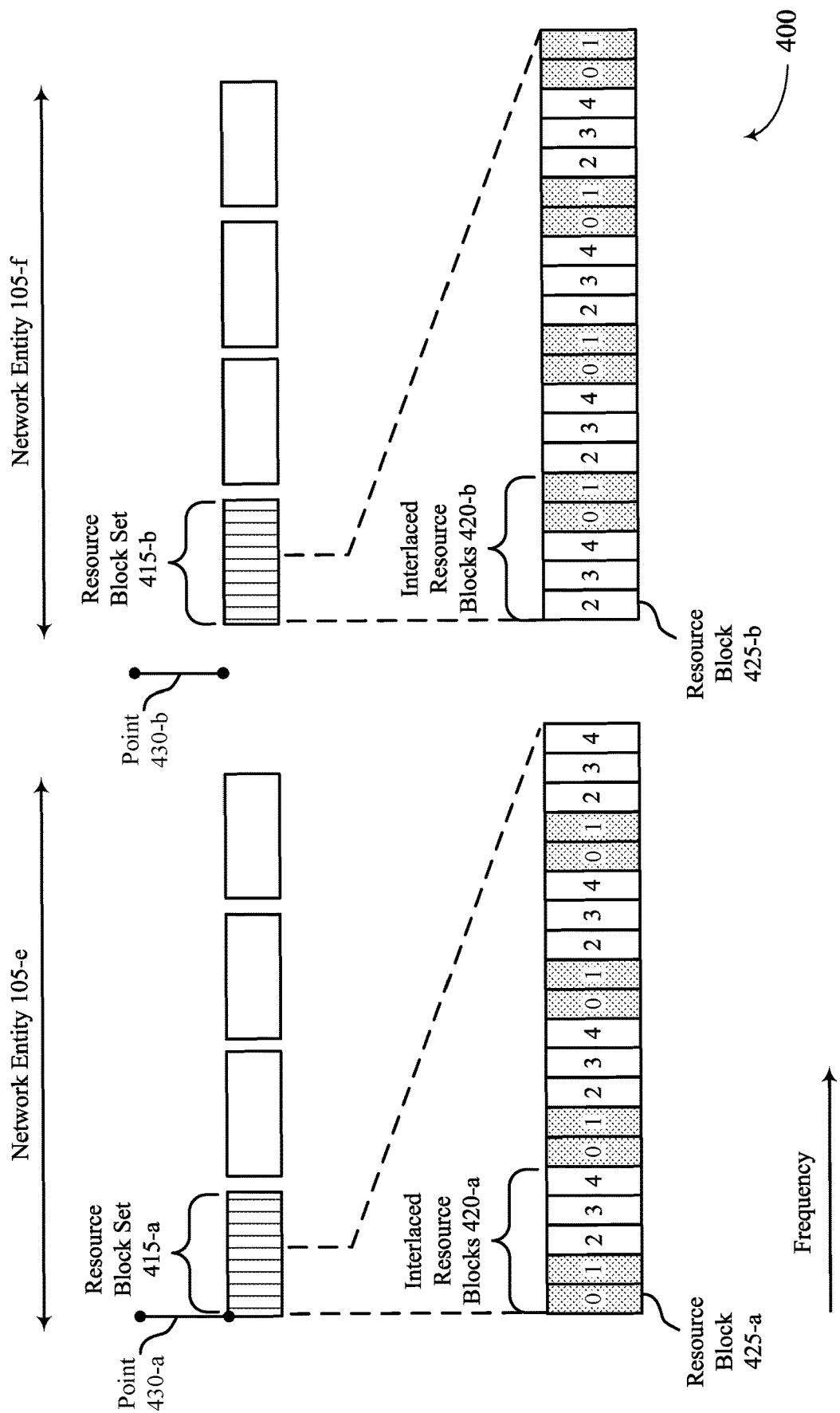

FIG. 4 illustrates an example of a resource allocation diagram 400 that supports uplink shared channel resource allocation for multi-cell scheduling in accordance with one or more aspects of the present disclosure. The resource allocation diagrams 400 may be implemented by network entities 105, UEs 115, or other devices described with reference to FIGS. 1 through 3. In accordance with resource allocation diagram 400, one or more common sets of resource block bits may be scheduled for a network entity 105-e and a network entity 105-f. The network entity 105-e and the network entity 105-f may be examples of the network entity 105 as described with reference to FIGS. 1 through 3.

The network entity 105-e may have one or more resource block sets, such as resource block set 415-a, and the network entity 105-f may have one or more resource block sets, such as the resource block set 415-d. The resource block set 415-a may include one or more interlaced resource blocks, such as the interlaced resource blocks 420-a, which may include one or more resource blocks, such as the resource block 425-a. The resource block set 415-b may include one or more interlaced resource blocks, such as the interlaced resource blocks 420-b, which may include one or more resource blocks, such as the resource block 425-b. The network entity 105-e may have a point 430-a and the network entity 105-f may have a point 430-b.

An interlace index (e.g., m) may be defined for resource blocks (e.g., resource block 425-a, resource block 425-b) for each network entity 105. The interlace index may be determined by the point 430-a for the network entity 105-e and the point 430-b for the network entity 105-f. The interlace index, m, may be different for the same resource block index of the cells where PUSCHs may be scheduled by a DCI message (e.g., DCI format 0_X). Accordingly, an interlace pattern of the one or more resource block indices may be different for the network entity 105-e and the network entity 105-f based on an alignment of a reference point (e.g., point 430-a, and point 430-b) being different for the network entity 105-e and the network entity 105-f. The misalignment of point 430-a and point 430-b may be based on a frequency spectrum grid misalignment between network entity 105-e and network entity 105-f.

Therefore, use of a common set of resource block bits does not necessarily mean the same interlace resource block pattern is scheduled for the multiple cells. Common resource block bits may be allocated for different interlace resource block patterns scheduled for the multiple cells. For example, point 430-a for the network entity 105-e may be aligned with the lower edge of the carrier (e.g., downlink bandwidth part), while point 430-b for the network entity 105-f may be two resource blocks lower than the lower edge of the carrier (e.g., downlink bandwidth part). Interlace indices (e.g., m=0, m=1) may be scheduled on the lower resource block set for both network entities (e.g., network entity 105-e and network entity 105-f). Therefore, resource block indices for 0 and 1 are commonly scheduled for both network entity 105-e and network entity 105-f, but the physical locations of the resource block indices 0 and 1 between the network entities 105 may be different.

Figure 5:
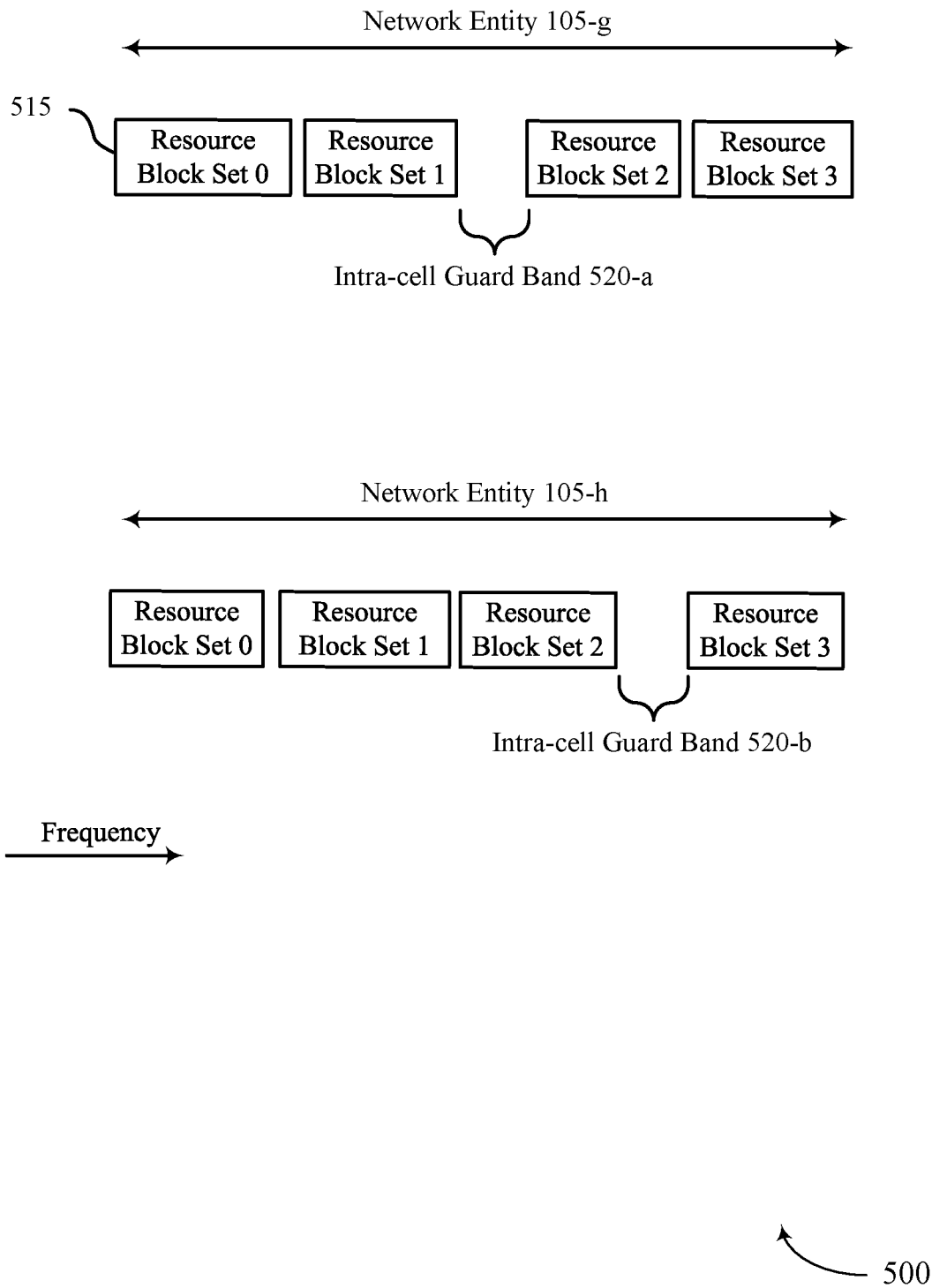

FIG. 5 illustrates an example of a resource allocation diagram 500 that supports uplink shared channel resource allocation for multi-cell scheduling in accordance with one or more aspects of the present disclosure. The resource allocation diagrams 500 may be implemented by network entities 105, UEs 115, or other devices described with reference to FIGS. 1 through 4. Resource allocation diagram 500 depicts resource block sets and corresponding indices for a network entity 105-g and a network entity 105-h. The network entity 105-g and the network entity 105-h may be examples of the network entity 105 as described with reference to FIGS. 1 through 4. The network entity 105-g and the network entity 105-h may have one or more resource block sets 515. Each network entity 105, or cell, may have one or more resource block sets 515.

In some cases, resource block sets may be separated by one or more resource blocks. The one or more resource blocks between resources block sets may be referred to as guard bands. For example, the network entity 105-g may have an intra-cell guard band 520-a between at least resource block set 1 and resource block set 2, and the network entity 105-*h* may have an intra-cell guard band 520-*b* between at least resource block set 2 and resource block set 3.

Resource block sets and corresponding indices may be defined, or identified per network entity 105 (e.g., the network entity 105-*g* and the network entity 105-*h*), per cell, etc., such that the resource block sets for network entity 105-*g* and 105-*h* may both include m=0, 1, 2, and 3 (e.g., the indexing is the same across network entities 105). A UE may be configured with FDRA Type 2 for one or more PUSCHs associated with multiple network entities 105 where the UE may monitor for a DCI message (e.g., DCI format 0_X) for PUSCH scheduling. The resource block sets for network entity 105-*g* and network entity 105-*h* may be indicated by a common set of bits, separate sets of bits, or a combination thereof in the DCI.

In some cases, the network entity 105-*g* and the network entity 105-*h* may have different resource block set patterns, such as based on higher-layer configurations. For example, the starting control resource block index and the number of control resource blocks for each resource block set may be based on radio resource control (RRC) parameters for intra-cell guard band configurations, such as intra-cell guard band 520-*a* and intra-cell guard band 520-*b*. Intra-cell guard band 520-*a* and intra-cell guard band 520-*b* may be resources scheduled between resource block sets resulting in different resource block set patterns between network entity 105-*h* and network entity 105-*g*. Different sets of physical resource blocks may be scheduled for different network entities 105, such as when a resource block set is scheduled for different network entities 105. For example, the resource block set 2 of the network entity 105-*g* and the resource block set 2 of the network entity 150-*h* may have different or the same physical resource blocks. Therefore, scheduling a resource block set of a same index (e.g., resource block set 2) on multiple cells does not necessarily mean the same set of PRBs in different cells are scheduled.

Figure 6:
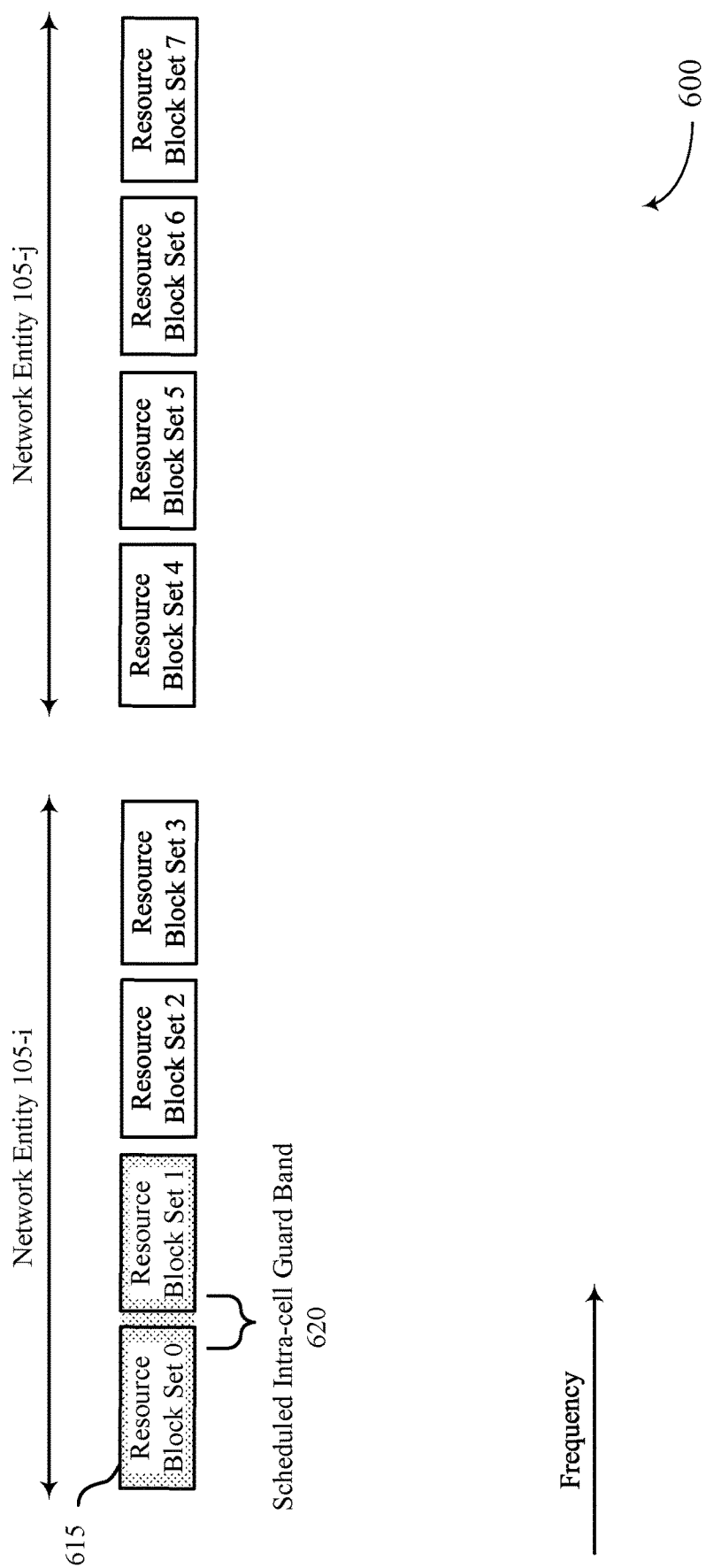

FIG. 6 illustrates an example of a resource allocation diagram 600 that supports uplink shared channel resource allocation for multi-cell scheduling in accordance with one or more aspects of the present disclosure. Resource allocation diagram 600 describes the scheduling of resources between resource block sets for a network entity 105-*i* and a network entity 105-*j*. The network entity 105-*i* and the network entity 105-*j* may be examples of the network entity 105 as described with reference to FIGS. 1 through 5. The network entity 105-*i* and the network entity 105-*j* may have one or more resource block sets 615. Each network entity 105, or cell, may have one or more resource block sets 615. The network entity 150-*i* may have a scheduled intra-cell guard band 620 between at least resource block set 0 and resource block set 1.

In some cases, resource block set bits, resource block sets, and corresponding indices may be defined, or identified, across multiple network entities. As such, the indexing of resource block sets may be applied continuously across network entities 105. For example, the indexing of resource block sets may start with a first resource block set of network entity 105-*i* and may continue through network entity 105-*j* resulting in network entity 105-*i* being associated with Resource Block Set 0 through 3 and network entity 105-*j* being associated with Resource Block Set 4 through 7. In such cases, common resource set bits for a group of PUSCHs may be scheduled by a DCI message (e.g., DCI format 0_X). The number of resource block set bits may be based on the number of resource block sets 615 across multiple network entities 105. For example, the resource block set bits may include eight bits, one for each Resource Block Set 0 through 7.

As described with reference to FIG. 5, resource block sets may be separated by one or more resource blocks. The one or more resource blocks between resources block sets may be referred to as guard bands. The guard bands may include any number of resource blocks and may not be uniform within a network entity 105 or across network entities 105. For example, the guard band between resource block set 0 and resource block set 1 may include a first quantity of resource blocks, the guard band between resource block set 2 and resource block set 3 may include a second quantity of resource blocks, the guard band between resource block set 3 and resource block set 4 may include a third quantity of resource blocks, and the guard band between resource block set 6 and resource block set 7 may include a fourth quantity of resource blocks, where the first, second, third, and fourth quantities may be the same or different.

A guard band between resource blocks sets 615 of a same network entity 105 may be referred to as an intra-cell guard band. In some cases, the intra-cell guard band between two scheduled resource blocks sets 615 may also be scheduled. For example, if multiple consecutive resource block sets 615, such as resource block set 0 and resource block set 1, associated with the network entity 105-*i* are scheduled, the intra-cell guard band between the resource block sets 615 may also be scheduled, resulting in scheduled intra-cell guard band 620. The scheduled intra-cell guard band 620-*a* may include interlaced resource blocks. In some cases, the DCI message may include an explicit indication that the intra-cell guard band is scheduled. In some cases, the UE may implicitly determine that the intra-cell guard band is scheduled based on the resource block sets 0 and 1 being scheduled and based on the resource block sets 0 and 1 being associated with the same network entity 105.

Figure 7:
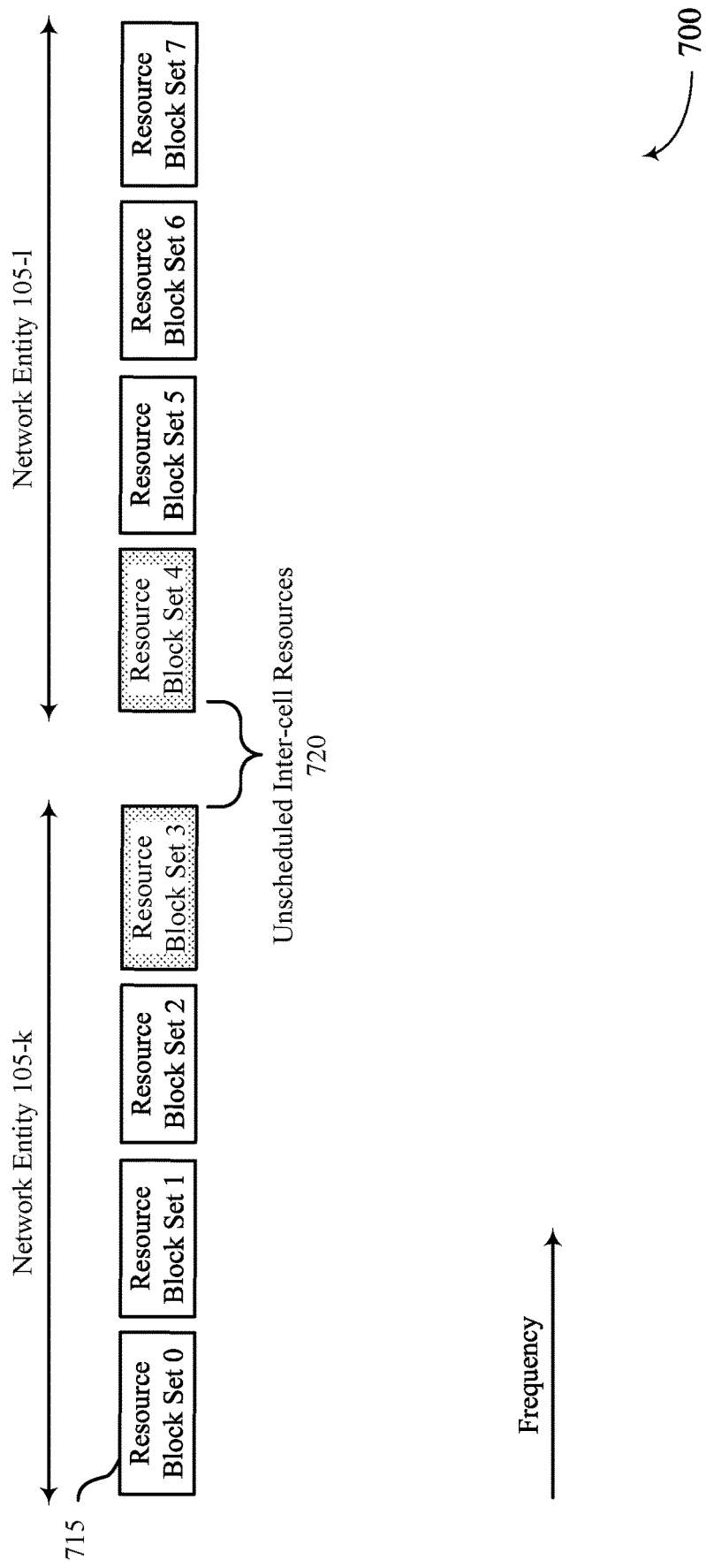

FIG. 7 illustrates an example of a resource allocation diagram 700 that supports uplink shared channel resource allocation for multi-cell scheduling in accordance with one or more aspects of the present disclosure. Resource allocation diagram 700 describes the scheduling of resources between resource block sets across a network entity 105-*k* and a network entity 105-1. The network entity 105-*j* and the network entity 105-1 may be examples of the network entity 105 as described with reference to FIGS. 1 and 6. The network entity 105-*k* and the network entity 105-1 may have one or more resource block sets 715. Each network entity 105 may have one or more resource block sets 715.

In some cases, and as described with reference to FIG. 6, resource block set bits, resource block sets, and corresponding indices may be defined, or identified, across multiple network entities. As such, the indexing of resource block sets may be applied continuously across network entities 105. For example, the indexing of resource block sets may start with a first resource block set of network entity 105-*i* and may continue through network entity 105-*j* resulting in network entity 105-*i* being associated with Resource Block Set 0 through 3 and network entity 105-*j* being associated with Resource Block Set 4 through 7. In such cases, common resource set bits may be used to schedule a group of PUSCHs by a DCI message (e.g., DCI format 0_X). The number of resource block set bits may be based on the number of resource blocks across multiple cells.

As described with reference to FIGS. 5 and 6, resource block sets may be separated by one or more resource blocks. The one or more resource blocks between resources block sets 715 may be referred to as guard bands. The guard bands may include any number of resource blocks and may not be uniform within a network entity 105 or across network entities 105. In some implementations, resources between multiple consecutive resource block sets 715 across two different cells may not be scheduled. For example, inter-cell resources between the network entity 105-*k* and the network entity 105-1, or resource block set 3 and resource block set 4 may not be scheduled (e.g., unscheduled inter-cell resources 720). In some cases, the DCI message may include an explicit indication that the inter-cell resources are not scheduled. In some cases, the UE may implicitly determine that the inter-cell resources are not scheduled based on the resource block sets 3 and 4 being scheduled and based on the resource block sets 3 and 4 being associated with different network entities 105.

Figure 8:
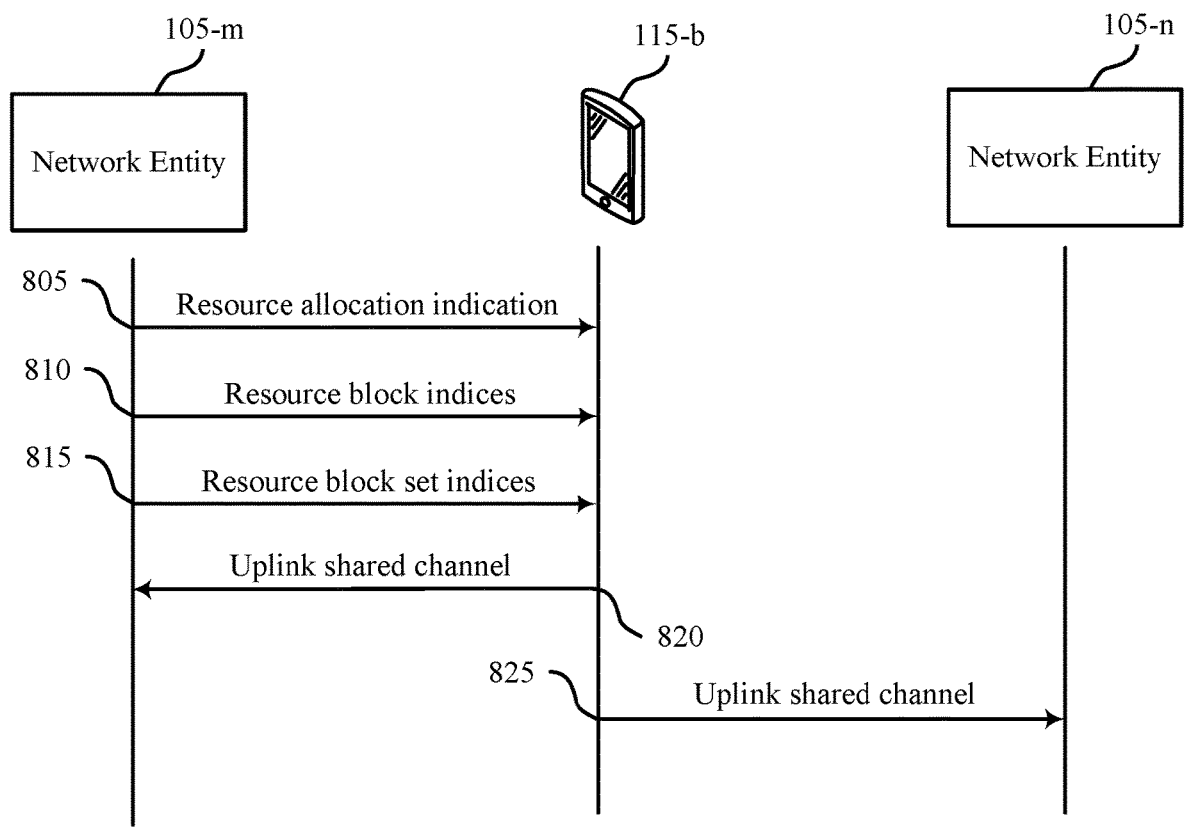
FIG. 8 illustrates an example of a process flow diagram that supports uplink shared channel resource allocation for multi-cell scheduling in accordance with one or more aspects of the present disclosure.

FIG. 8 illustrates an example of a process flow diagram 800 that supports uplink shared channel resource allocation for multi-cell scheduling in accordance with one or more aspects of the present disclosure. Process flow diagram 800 describes the scheduling of resource blocks and resource block sets for uplink messages to be transmitted by UE 115-*b* to a network entity 105-*m* and a network entity 105-*n*. The network entity 105-*m* and the network entity 105-*n* may be examples of the network entity 105 as described with reference to FIGS. 1 through 8. In some cases, the network entity 105-*m* and the network entity 105-*n* may represent cells. In some cases, the network entity 105-*m* and the network entity 105-*n* may be associated with different cells. The UE 115-*b* may be an example of the UE 115 as described with reference to FIGS. 1 through 8.

At 805, the network entity 105-*m* may transmit, and the UE 115-*b* may receive, a resource allocation indication. The resource allocation indication may include a DCI, or some other control message, indicating that uplink shared channel messages to at least a first network entity (e.g., the network entity 150-*m*) and a second network entity (e.g., the network entity 105-*n*) may be scheduled in accordance with a resource allocation type (e.g., FDRA Type 2). The format of the DCI message may be based on the DCI message scheduling uplink shared channel messages to at least the first network entity and the second network entity in accordance with the resource allocation type.

At 810, the network entity 105-*m* may transmit, and the UE 115-*b* may receive, resource block indices. The resource block indices may include resource block bits, or a first set of bits. The first set of bits may indicate one or more resource block indices based on the resource allocation type. The first set of bits may be commonly associated with at least the first network entity (e.g., network entity 105-*m*) and the second network entity (e.g., network entity 105-*n*), where the one or more resource block indices may be allocated for transmission of the uplink shared channel messages to at least the first network entity and the second network entity.

The first set of bits, or the resource block bits, may include subsets of bits, where each subset of bits may be associated with a different network entity 105, and each subset of bits may indicate a set of resource block indices associated with a corresponding network entity 105. The subset of bits may include a first subset of bits associated with the first network entity (e.g., network entity 105-*m*) and a second subset of bits associated with the second network entity (e.g., network entity 105-*n*) based on the first network entity 105 and the second network entity 105 being different network entities 105.

The first subset of bits may indicate a first set of resource block indices allocated for transmission of the uplink shared channel messages to the first network entity 105 and the second subset of bits may indicate a second set of resource block indices allocated for transmission of the uplink shared channel messages to the second network entity 105. A number of the subsets of bits included in the first set of bits may be based on a number of network entities 105 configured to be scheduled by the DCI message. A number of bits included in the first set of bits may be based on a subcarrier spacing associated with the one or more resource blocks.

The resource block indices may indicate the first set of bits including subsets of bits, where each subset of bits may be associated with a different group of one or more network entities 105, and each subset of bits may indicate a set of resource block indices associated with a corresponding group of network entities 105. A number of subsets of bits included in the first set of bits may be based on a number of groups of network entities 105 configured to be scheduled by the DCI message. The first network entity (e.g., network entity 105-*m*) and the second network entity (e.g., network entity 105-*n*) may be included in a same group of network entities 105 or different groups of network entities 105.

An interlace pattern of the one or more resource block indices may be different for the first network entity (e.g., network entity 105-*m*) and the second network entity (e.g., network entity 105-*n*) in accordance with the first set of bits that are commonly associated with at least the first network entity and the second network entity based on an alignment of a reference point being different for the first network entity and the second network entity 105, where the reference point is for identifying resource block indices.

At 815, the network entity 105-*m* may transmit, and the UE 115-*b* may receive, resource block set indices. The resource block set indices may include resource block set bits, or a second set of bits. The second set of bits may indicate one or more resource block set indices based on the resource allocation type. The second set of bit may be multiple first sets of bits, where each multiple is associated with a different network entity 105, and where each multiple indicates a set of resource block indices associated with a corresponding network entity 105. A number of multiples of the multiple first sets of bits may be based on a number of network entities 105 configured to be scheduled by the DCI message.

The second set of bits, or the resource block set bits, may be associated with at least the first network entity 105 and the second network entity 105 based on the resource block indices being assigned to resource block sets per network entity 105, where the one or more resource block set indices may be allocated for transmission of the uplink shared channel messages to at least the first network entity 105 and the second network entity 105. A number of bits included in the second set of bits may be based on a network entity 105 of at least the first network entity 105 and the second network entity 105 being associated with a highest number of resource block sets.

A resource block set configuration associated with the first network entity 105 may be different from a resource block set configuration associated with the second network entity 105 based on intra-cell guard band configurations associated with the respective first and second network entities. Each resource block set configuration may indicate a starting common resource block index and a number of common resource blocks associated with each resource block set. The starting common resource block index, the number of common resource blocks, or both may be different for one or more of the resource block sets configured for the first network entity 105 and the second network entity 105.

The second set of bits may include subsets of bits, where each subset of bits may be associated with a different network entity 105, and where each subset of bits indicates a set of resource block set indices associated with a corresponding network entity 105. The subsets of bits may include a first subset of bits associated with the first network entity 105 and a second subset of bits associated with the second network entity 105 based at least in part on the first network entity 105 and the second network entity 105 being different network entities 105. The first subset of bits indicates a first set of resource block set indices allocated for transmission of the uplink shared channel messages to the first network entity 105 and the second subset of bits indicates a second set of resource block set indices allocated for transmission of the uplink shared channel messages to the second network entity 105. A number of the subsets of bits included in the first set of may be based on a number of network entities 105 configured to be scheduled by the DCI message.

The UE 115-b may receive multiple second sets of bits, where each multiple may be associated with a different network entity 105, and where each multiple indicates a set of resource block set indices associated with a corresponding network entity 105. The number of multiples of the multiple second sets of bits may be based on a number of network entities 105 configured to be scheduled by the DCI message.

The second set of bits may include subsets of bits, where each subset of bits may be associated with a different group of one or more network entities 105, and where each subset of bits indicates a set of resource block indices associated with a corresponding group of network entities 105. A number of subsets of bits included in the second set of bits may be based on a number of groups of network entities 105 configured to be scheduled by the DCI message. The first network entity 105 (e.g., network entity 105-m) and the second network entity 105 (e.g., network entity 105-n) may be included in a same group of network entities 105 or different groups of network entities 105. The second set of bits may be commonly associated with at least the first network entity 105 and the second network entity 105 based on resource block set indices being assigned to resource block sets across at least the first network entity 105 and the second network entity 105, where each bit in the second set of bits corresponds to a different resource block set index.

The second set of bits may indicate that consecutive resource block sets associated with the first network entity 105 are scheduled by the DCI message, and may identify that resource blocks between the consecutive resource block sets are scheduled for the uplink shared channel messages based on the consecutive resource block sets being associated with a same network entity 105. The second set of bits may indicate that a first resource block set associated with the first network entity 105 and a consecutive resource block set associated with the second network entity 105 are scheduled by the DCI message, and may identify that resource blocks between the first resource block set and the consecutive resource block set are unscheduled for the uplink shared channel messages based on the first resource block set and the consecutive resource block set being associated with different network entities 105. A number of bits in the second set of bits may be based on a number of resource block sets allocated across at least the first network entity 105 and the second network entity 105.

In some examples, the DCI message may include the first set of bits and the second set of bits.

At 820, the UE 115-b may transmit one or more uplink shared channels to the network entity 105-m. At 825, the UE 115-b may transmit one or more uplink shared channels to the network entity 105-n. The uplink shared channel may be transmitted via uplink shared channel messages to at least the first network entity (e.g., the network entity 105-m) and the second network entity (e.g., the network entity 105-n) according to the first set of bits and the second set of bits.

Figure 9:
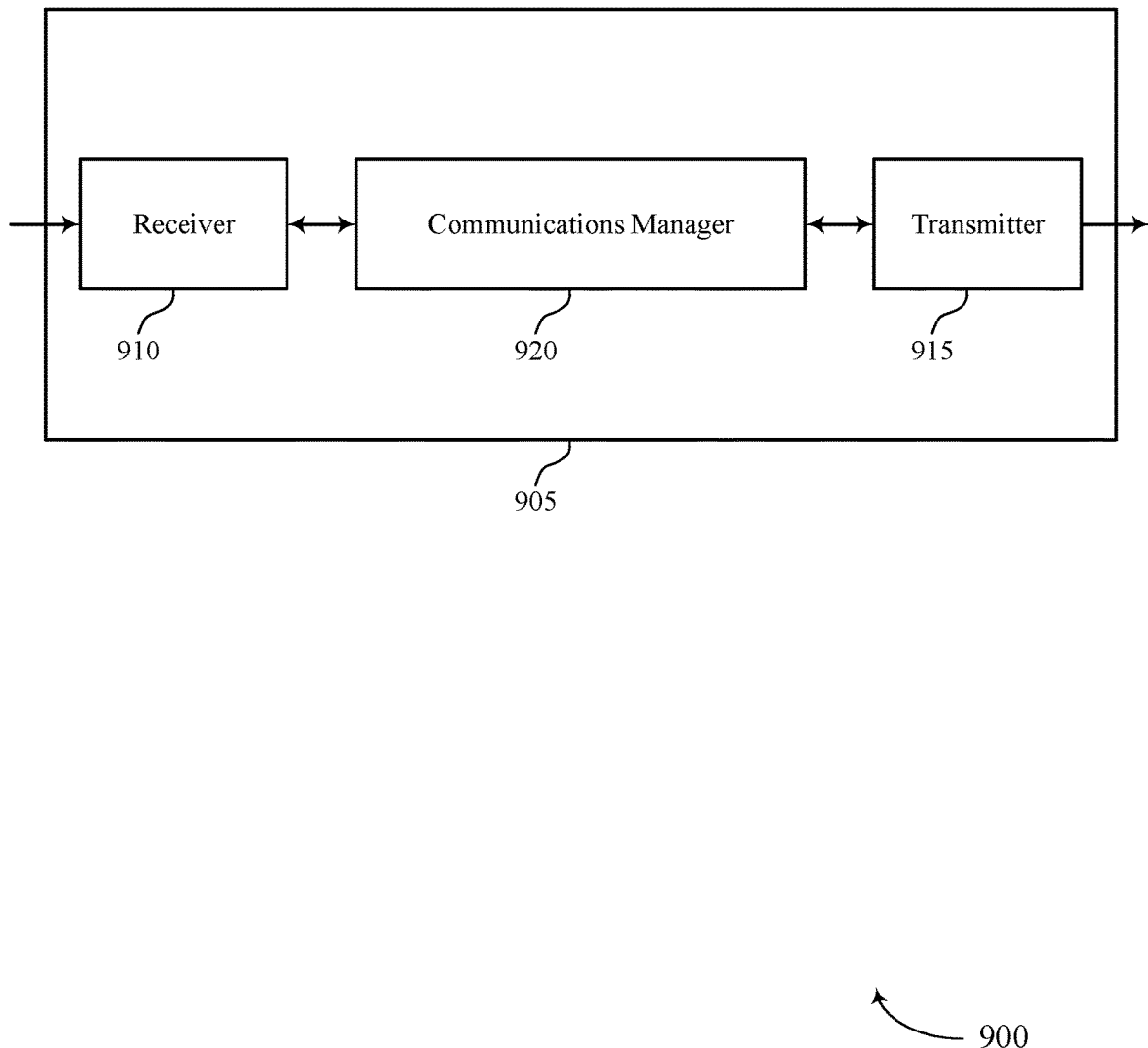
FIGS. 9 and 10 show block diagrams of devices that support uplink shared channel resource allocation for multi-cell scheduling in accordance with one or more aspects of the present disclosure.

FIG. 9 shows a block diagram 900 of a device 905 that supports uplink shared channel resource allocation for multi-cell scheduling in accordance with one or more aspects of the present disclosure. The device 905 may be an example of aspects of a UE 115 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to uplink shared channel resource allocation for multi-cell scheduling). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to uplink shared channel resource allocation for multi-cell scheduling). In some examples, the transmitter 915 may be co-located with a receiver 910 in a transceiver module. The transmitter 915 may utilize a single antenna or a set of multiple antennas.

The communications manager 920, the receiver 910, the transmitter 915, or various combinations thereof or various components thereof may be examples of means for performing various aspects of uplink shared channel resource allocation for multi-cell scheduling as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 920 may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communications at a UE in accordance with examples as disclosed herein. For example, the communications manager 920 may be configured as or otherwise support a means for receiving a DCI message indicating that uplink shared channel messages to at least a first network entity and a second network entity are scheduled in accordance with a resource allocation type. The communications manager 920 may be configured as or otherwise support a means for receiving a first set of bits indicative of one or more resource block indices based on the resource allocation type. The communications manager 920 may be configured as or otherwise support a means for receiving a second set of bits indicative of one or more resource block set indices based on the resource allocation type. The communications manager 920 may be configured as or otherwise support a means for transmitting the uplink shared channel messages to at least the first network entity and the second network entity in accordance with the first set of bits and the second set of bits.

By including or configuring the communications manager 920 in accordance with examples as described herein, the device 905 (e.g., a processor controlling or otherwise coupled with the receiver 910, the transmitter 915, the communications manager 920, or a combination thereof) may support techniques for support uplink shared channel resource allocation for multi-cell scheduling, which may result in reduced processing, reduced power consumption, or more efficient utilization of communication resources.

Figure 10:
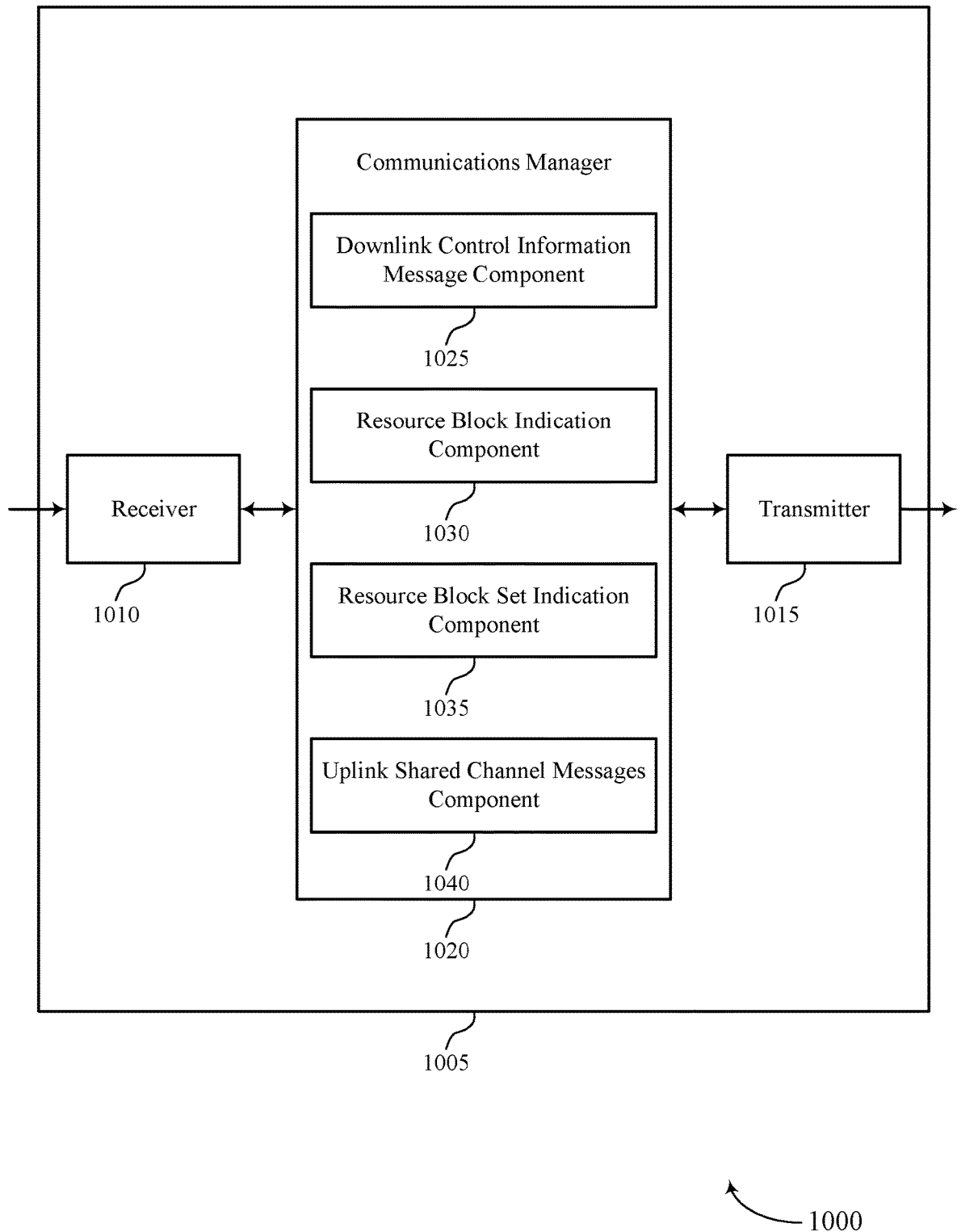

FIG. 10 shows a block diagram 1000 of a device 1005 that supports uplink shared channel resource allocation for multi-cell scheduling in accordance with one or more aspects of the present disclosure. The device 1005 may be an example of aspects of a device 905 or a UE 115 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to uplink shared channel resource allocation for multi-cell scheduling). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to uplink shared channel resource allocation for multi-cell scheduling). In some examples, the transmitter 1015 may be co-located with a receiver 1010 in a transceiver module. The transmitter 1015 may utilize a single antenna or a set of multiple antennas.

The device 1005, or various components thereof, may be an example of means for performing various aspects of uplink shared channel resource allocation for multi-cell scheduling as described herein. For example, the communications manager 1020 may include a DCI message component 1025, a resource block indication component 1030, a resource block set indication component 1035, an uplink shared channel messages component 1040, or any combination thereof. The communications manager 1020 may be an example of aspects of a communications manager 920 as described herein. In some examples, the communications manager 1020, or various components thereof, may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communications at a UE in accordance with examples as disclosed herein. The DCI message component 1025 may be configured as or otherwise support a means for receiving a DCI message indicating that uplink shared channel messages to at least a first network entity and a second network entity are scheduled in accordance with a resource allocation type. The resource block indication component 1030 may be configured as or otherwise support a means for receiving a first set of bits indicative of one or more resource block indices based on the resource allocation type. The resource block set indication component 1035 may be configured as or otherwise support a means for receiving a second set of bits indicative of one or more resource block set indices based on the resource allocation type. The uplink shared channel messages component 1040 may be configured as or otherwise support a means for transmitting the uplink shared channel messages to at least the first network entity and the second network entity in accordance with the first set of bits and the second set of bits.

Figure 11:
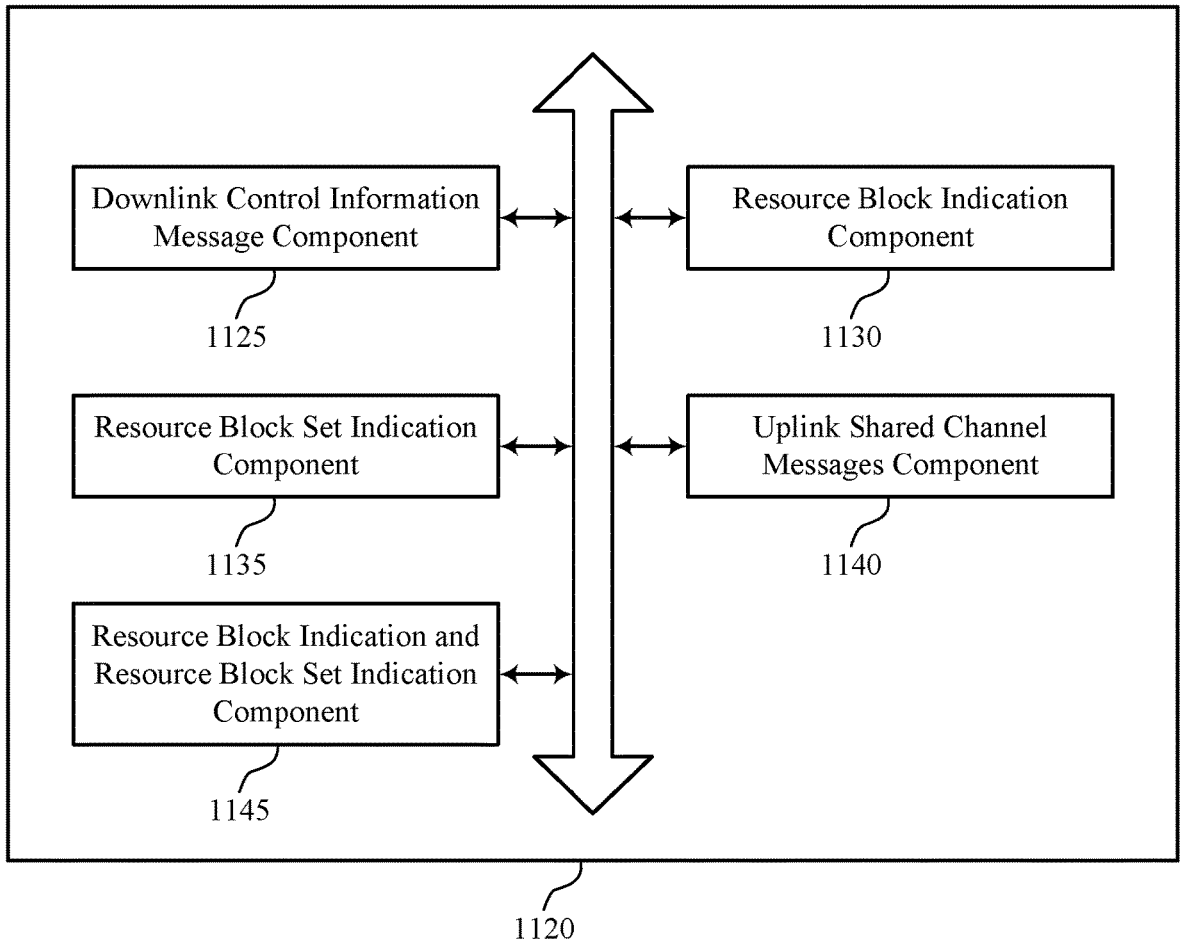
FIG. 11 shows a block diagram of a communications manager that supports uplink shared channel resource allocation for multi-cell scheduling in accordance with one or more aspects of the present disclosure.

FIG. 11 shows a block diagram 1100 of a communications manager 1120 that supports uplink shared channel resource allocation for multi-cell scheduling in accordance with one or more aspects of the present disclosure. The communications manager 1120 may be an example of aspects of a communications manager 920, a communications manager 1020, or both, as described herein. The communications manager 1120, or various components thereof, may be an example of means for performing various aspects of uplink shared channel resource allocation for multi-cell scheduling as described herein. For example, the communications manager 1120 may include a DCI message component 1125, a resource block indication component 1130, a resource block set indication component 1135, an uplink shared channel messages component 1140, a resource block indication and resource block set indication component 1145, or any combination thereof. Each of these components may communicate, directly or indirectly, with one another (e.g., via one or more buses).

The communications manager 1120 may support wireless communications at a UE in accordance with examples as disclosed herein. The DCI message component 1125 may be configured as or otherwise support a means for receiving a DCI message indicating that uplink shared channel messages to at least a first network entity and a second network entity are scheduled in accordance with a resource allocation type. The resource block indication component 1130 may be configured as or otherwise support a means for receiving a first set of bits indicative of one or more resource block indices based on the resource allocation type. The resource block set indication component 1135 may be configured as or otherwise support a means for receiving a second set of bits indicative of one or more resource block set indices based on the resource allocation type. The uplink shared channel messages component 1140 may be configured as or otherwise support a means for transmitting the uplink shared channel messages to at least the first network entity and the second network entity in accordance with the first set of bits and the second set of bits.

In some examples, to support receiving the first set of bits, the resource block indication component 1130 may be configured as or otherwise support a means for receiving the first set of bits that are commonly associated with at least the first network entity and the second network entity, where the one or more resource block indices are allocated for transmission of the uplink shared channel messages to at least the first network entity and the second network entity.

In some examples, an interlace pattern of the one or more resource block indices is different for the first network entity and the second network entity in accordance with the first set of bits that are commonly associated with at least the first network entity and the second network entity based on an alignment of a reference point being different for the first network entity and the second network entity, the reference point is for identifying resource block indices.

In some examples, to support receiving the first set of bits, the resource block indication component 1130 may be configured as or otherwise support a means for receiving the first set of bits including subsets of bits, where each subset of bits is associated with a different network entity, and where each subset of bits indicates a set of resource block indices associated with a corresponding network entity.

In some examples, the subsets of bits includes a first subset of bits associated with the first network entity and a second subset of bits associated with the second network entity based on the first network entity and the second network entity being different network entities.

In some examples, the first subset of bits indicates a first set of resource block indices allocated for transmission of the uplink shared channel messages to the first network entity and the second subset of bits indicates a second set of resource block indices allocated for transmission of the uplink shared channel messages to the second network entity.

In some examples, a number of the subsets of bits included in the first set of bits is based on a number of network entities configured to be scheduled by the DCI message.

In some examples, to support receiving the second set of bits, the resource block set indication component 1135 may be configured as or otherwise support a means for receiving multiple first sets of bits, where each multiple is associated with a different network entity, and where each multiple indicates a set of resource block indices associated with a corresponding network entity.

In some examples, a number of multiples of the multiple first sets of bits is based on a number of network entities configured to be scheduled by the DCI message.

In some examples, to support receiving the first set of bits, the resource block indication component 1130 may be configured as or otherwise support a means for receiving the first set of bits including subsets of bits, where each subset of bits is associated with a different group of one or more network entities, and where each subset of bits indicates a set of resource block indices associated with a corresponding group of network entities.

In some examples, a number of subsets of bits included in the first set of bits is based on a number of groups of network entities configured to be scheduled by the DCI message.

In some examples, the first network entity and the second network entity are included in a same group of network entities or different groups of network entities.

In some examples, to support receiving the second set of bits, the resource block set indication component 1135 may be configured as or otherwise support a means for receiving the second set of bits that are commonly associated with at least the first network entity and the second network entity based on resource block indices being assigned to resource block sets per network entity, where the one or more resource block set indices are allocated for transmission of the uplink shared channel messages to at least the first network entity and the second network entity.

In some examples, a number of bits included in the second set of bits is based on a network entity of at least the first network entity and the second network entity being associated with a highest number of resource block sets.

In some examples, a resource block set configuration associated with the first network entity is different from a resource block set configuration associated with the second network entity based on intra-cell guard band configurations associated with the respective first and second network entities.

In some examples, each resource block set configuration is indicative of a starting common resource block index and a number of common resource blocks associated with each resource block set, the starting common resource block index, the number of common resource blocks, or both being different for one or more of the resource block sets configured for the first network entity and the second network entity.

In some examples, to support receiving the second set of bits, the resource block set indication component 1135 may be configured as or otherwise support a means for receiving the second set of bits including subsets of bits, where each subset of bits is associated with a different network entity, and where each subset of bits indicates a set of resource block set indices associated with a corresponding network entity.

In some examples, the subsets of bits includes a first subset of bits associated with the first network entity and a second subset of bits associated with the second network entity based on the first network entity and the second network entity being different network entities.

In some examples, the first subset of bits indicates a first set of resource block set indices allocated for transmission of the uplink shared channel messages to the first network entity and the second subset of bits indicates a second set of resource block set indices allocated for transmission of the uplink shared channel messages to the second network entity.

In some examples, a number of the subsets of bits included in the first set of bits is based on a number of network entities configured to be scheduled by the DCI message.

In some examples, to support receiving the second set of bits, the resource block set indication component 1135 may be configured as or otherwise support a means for receiving multiple second sets of bits, where each multiple is associated with a different network entity, and where each multiple indicates a set of resource block set indices associated with a corresponding network entity.

In some examples, a number of multiples of the multiple second sets of bits is based on a number of network entities configured to be scheduled by the DCI message.

In some examples, to support receiving the second set of bits, the resource block set indication component 1135 may be configured as or otherwise support a means for receiving the second set of bits including subsets of bits, where each subset of bits is associated with a different group of one or more network entities, and where each subset of bits indicates a set of resource block indices associated with a corresponding group of network entities.

In some examples, a number of subsets of bits included in the second set of bits is based on a number of groups of network entities configured to be scheduled by the DCI message.

In some examples, the first network entity and the second network entity are included in a same group of network entities or different groups of network entities.

In some examples, to support receiving the second set of bits, the resource block set indication component 1135 may be configured as or otherwise support a means for receiving the second set of bits that are commonly associated with at least the first network entity and the second network entity based on resource block set indices being assigned to resource block sets across at least the first network entity and the second network entity, where each bit in the second set of bits corresponds to a different resource block set index.

In some examples, the second set of bits indicates that consecutive resource block sets associated with the first network entity are scheduled by the DCI message, and the resource block set indication component 1135 may be configured as or otherwise support a means for identifying that resource blocks between the consecutive resource block sets are scheduled for the uplink shared channel messages based on the consecutive resource block sets being associated with a same network entity.

In some examples, the second set of bits indicates that a first resource block set associated with the first network entity and a consecutive resource block set associated with the second network entity are scheduled by the DCI message, and the resource block set indication component 1135 may be configured as or otherwise support a means for identifying that resource blocks between the first resource block set and the consecutive resource block set are unscheduled for the uplink shared channel messages based on the first resource block set and the consecutive resource block set being associated with different network entities.

In some examples, a number of bits included in the second set of bits is based on a number of resource block sets allocated across at least the first network entity and the second network entity.

In some examples, to support receiving the first set of bits and the second set of bits, the resource block indication and resource block set indication component 1145 may be configured as or otherwise support a means for receiving a message including the first set of bits and the second set of bits.

In some examples, the message is the DCI message.

In some examples, a format of the DCI message is based on the DCI message scheduling the uplink shared channel messages to at least the first network entity and the second network entity in accordance with the resource allocation type.

In some examples, a number of bits included in the first set of bits is based on a subcarrier spacing associated with the one or more resource blocks.

Figure 12:
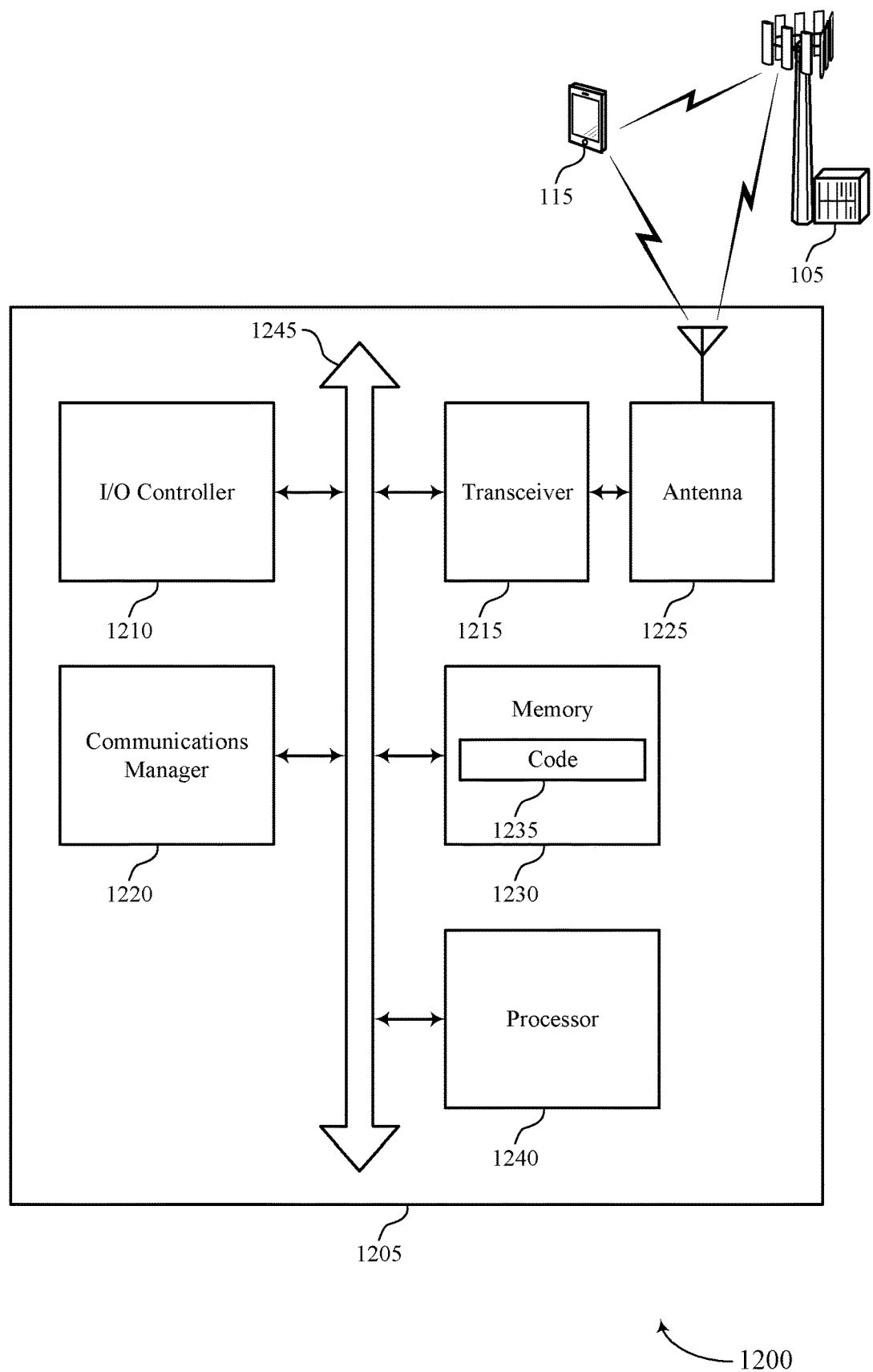
FIG. 12 shows a diagram of a system including a device that supports uplink shared channel resource allocation for multi-cell scheduling in accordance with one or more aspects of the present disclosure.

FIG. 12 shows a diagram of a system 1200 including a device 1205 that supports uplink shared channel resource allocation for multi-cell scheduling in accordance with one or more aspects of the present disclosure. The device 1205 may be an example of or include the components of a device 905, a device 1005, or a UE 115 as described herein. The device 1205 may communicate (e.g., wirelessly) with one or more network entities 105, one or more UEs 115, or any combination thereof. The device 1205 may include components for bi-directional voice and data communications including components for transmitting and receiving communications, such as a communications manager 1220, an input/output (I/O) controller 1210, a transceiver 1215, an antenna 1225, a memory 1230, code 1235, and a processor 1240. These components may be in electronic communication or otherwise coupled (e.g., operatively, communicatively, functionally, electronically, electrically) via one or more buses (e.g., a bus 1245).

The I/O controller 1210 may manage input and output signals for the device 1205. The I/O controller 1210 may also manage peripherals not integrated into the device 1205. In some cases, the I/O controller 1210 may represent a physical connection or port to an external peripheral. In some cases, the I/O controller 1210 may utilize an operating system such as iOS®, ANDROID®, MS-DOS®, MS-WINDOWS®, OS/2®, UNIX®, LINUX®, or another known operating system. Additionally, or alternatively, the I/O controller 1210 may represent or interact with a modem, a keyboard, a mouse, a touchscreen, or a similar device. In some cases, the I/O controller 1210 may be implemented as part of a processor, such as the processor 1240. In some cases, a user may interact with the device 1205 via the I/O controller 1210 or via hardware components controlled by the I/O controller 1210.

In some cases, the device 1205 may include a single antenna 1225. However, in some other cases, the device 1205 may have more than one antenna 1225, which may be capable of concurrently transmitting or receiving multiple wireless transmissions. The transceiver 1215 may communicate bi-directionally, via the one or more antennas 1225, wired, or wireless links as described herein. For example, the transceiver 1215 may represent a wireless transceiver and may communicate bi-directionally with another wireless transceiver. The transceiver 1215 may also include a modem to modulate the packets, to provide the modulated packets to one or more antennas 1225 for transmission, and to demodulate packets received from the one or more antennas 1225. The transceiver 1215, or the transceiver 1215 and one or more antennas 1225, may be an example of a transmitter 915, a transmitter 1015, a receiver 910, a receiver 1010, or any combination thereof or component thereof, as described herein.

The memory 1230 may include random access memory (RAM) and read-only memory (ROM). The memory 1230 may store computer-readable, computer-executable code

1235 including instructions that, when executed by the processor 1240, cause the device 1205 to perform various functions described herein. The code 1235 may be stored in a non-transitory computer-readable medium such as system memory or another type of memory. In some cases, the code 1235 may not be directly executable by the processor 1240 but may cause a computer (e.g., when compiled and executed) to perform functions described herein. In some cases, the memory 1230 may contain, among other things, a basic I/O system (BIOS) which may control basic hardware or software operation such as the interaction with peripheral components or devices.

The processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting uplink shared channel resource allocation for multi-cell scheduling). For example, the device 1205 or a component of the device 1205 may include a processor 1240 and memory 1230 coupled with or to the processor 1240, the processor 1240 and memory 1230 configured to perform various functions described herein.

The communications manager 1220 may support wireless communications at a UE in accordance with examples as disclosed herein. For example, the communications manager 1220 may be configured as or otherwise support a means for receiving a DCI message indicating that uplink shared channel messages to at least a first network entity and a second network entity are scheduled in accordance with a resource allocation type. The communications manager 1220 may be configured as or otherwise support a means for receiving a first set of bits indicative of one or more resource block indices based on the resource allocation type. The communications manager 1220 may be configured as or otherwise support a means for receiving a second set of bits indicative of one or more resource block set indices based on the resource allocation type. The communications manager 1220 may be configured as or otherwise support a means for transmitting the uplink shared channel messages to at least the first network entity and the second network entity in accordance with the first set of bits and the second set of bits.

By including or configuring the communications manager 1220 in accordance with examples as described herein, the device 1205 may support techniques for support uplink shared channel resource allocation for multi-cell scheduling, which may result in improved communication reliability, reduced latency, improved user experience related to reduced processing, reduced power consumption, more efficient utilization of communication resources, improved coordination between devices, longer battery life, or improved utilization of processing capability.

In some examples, the communications manager 1220 may be configured to perform various operations (e.g., receiving, monitoring, transmitting) using or otherwise in cooperation with the transceiver 1215, the one or more antennas 1225, or any combination thereof. Although the communications manager 1220 is illustrated as a separate component, in some examples, one or more functions described with reference to the communications manager 1220 may be supported by or performed by the processor 1240, the memory 1230, the code 1235, or any combination thereof. For example, the code 1235 may include instructions executable by the processor 1240 to cause the device 1205 to perform various aspects of uplink shared channel resource allocation for multi-cell scheduling as described herein, or the processor 1240 and the memory 1230 may be otherwise configured to perform or support such operations.

Figure 13:
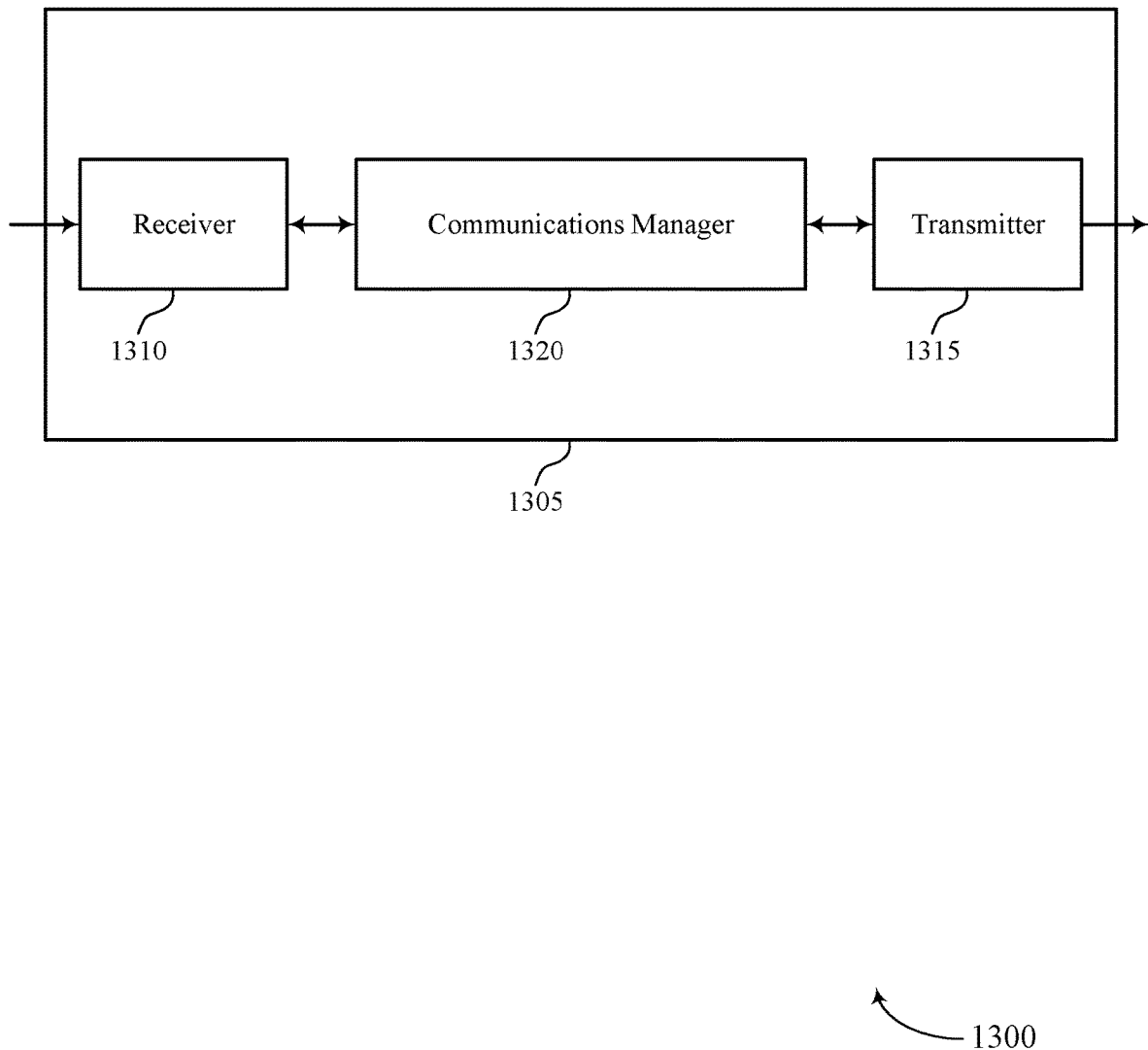
FIGS. 13 and 14 show block diagrams of devices that support uplink shared channel resource allocation for multi-cell scheduling in accordance with one or more aspects of the present disclosure.

FIG. 13 shows a block diagram 1300 of a device 1305 that supports uplink shared channel resource allocation for multi-cell scheduling in accordance with one or more aspects of the present disclosure. The device 1305 may be an example of aspects of a network entity 105 as described herein. The device 1305 may include a receiver 1310, a transmitter 1315, and a communications manager 1320. The device 1305 may also include a processor. Each of these components may be in communication with one another (e.g., via one or more buses).

The receiver 1310 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1305. In some examples, the receiver 1310 may support obtaining information by receiving signals via one or more antennas. Additionally, or alternatively, the receiver 1310 may support obtaining information by receiving signals via one or more wired (e.g., electrical, fiber optic) interfaces, wireless interfaces, or any combination thereof.

The transmitter 1315 may provide a means for outputting (e.g., transmitting, providing, conveying, sending) information generated by other components of the device 1305. For example, the transmitter 1315 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1315 may support outputting information by transmitting signals via one or more antennas. Additionally, or alternatively, the transmitter 1315 may support outputting information by transmitting signals via one or more wired (e.g., electrical, fiber optic) interfaces, wireless interfaces, or any combination thereof. In some examples, the transmitter 1315 and the receiver 1310 may be co-located in a transceiver, which may include or be coupled with a modem.

The communications manager 1320, the receiver 1310, the transmitter 1315, or various combinations thereof or various components thereof may be examples of means for performing various aspects of uplink shared channel resource allocation for multi-cell scheduling as described herein. For example, the communications manager 1320, the receiver 1310, the transmitter 1315, or various combinations or components thereof may support a method for performing one or more of the functions described herein.

In some examples, the communications manager 1320, the receiver 1310, the transmitter 1315, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1320, the receiver 1310, the transmitter 1315, or various combinations or components thereof may be implemented in code (e.g., as communications management software or firmware) executed by a processor. If implemented in code executed by a processor, the functions of the communications manager 1320, the receiver 1310, the transmitter 1315, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 1320 may be configured to perform various operations (e.g., receiving, obtaining, monitoring, outputting, transmitting) using or otherwise in cooperation with the receiver 1310, the transmitter 1315, or both. For example, the communications manager 1320 may receive information from the receiver 1310, send information to the transmitter 1315, or be integrated in combination with the receiver 1310, the transmitter 1315, or both to obtain information, output information, or perform various other operations as described herein.

The communications manager 1320 may support wireless communications at a first network entity in accordance with examples as disclosed herein. For example, the communications manager 1320 may be configured as or otherwise support a means for transmitting a DCI message indicating that uplink shared channel messages to at least the first network entity and a second network entity are scheduled in accordance with a resource allocation type. The communications manager 1320 may be configured as or otherwise support a means for transmitting a first set of bits indicative of one or more resource block indices based on the resource allocation type. The communications manager 1320 may be configured as or otherwise support a means for transmitting a second set of bits indicative of one or more resource block set indices based on the resource allocation type. The communications manager 1320 may be configured as or otherwise support a means for receiving the uplink shared channel messages in accordance with the first set of bits and the second set of bits.

By including or configuring the communications manager 1320 in accordance with examples as described herein, the device 1305 (e.g., a processor controlling or otherwise coupled with the receiver 1310, the transmitter 1315, the communications manager 1320, or a combination thereof) may support techniques for support uplink shared channel resource allocation for multi-cell scheduling, which may result in reduced processing, reduced power consumption, more efficient utilization of communication resources.

Figure 14:
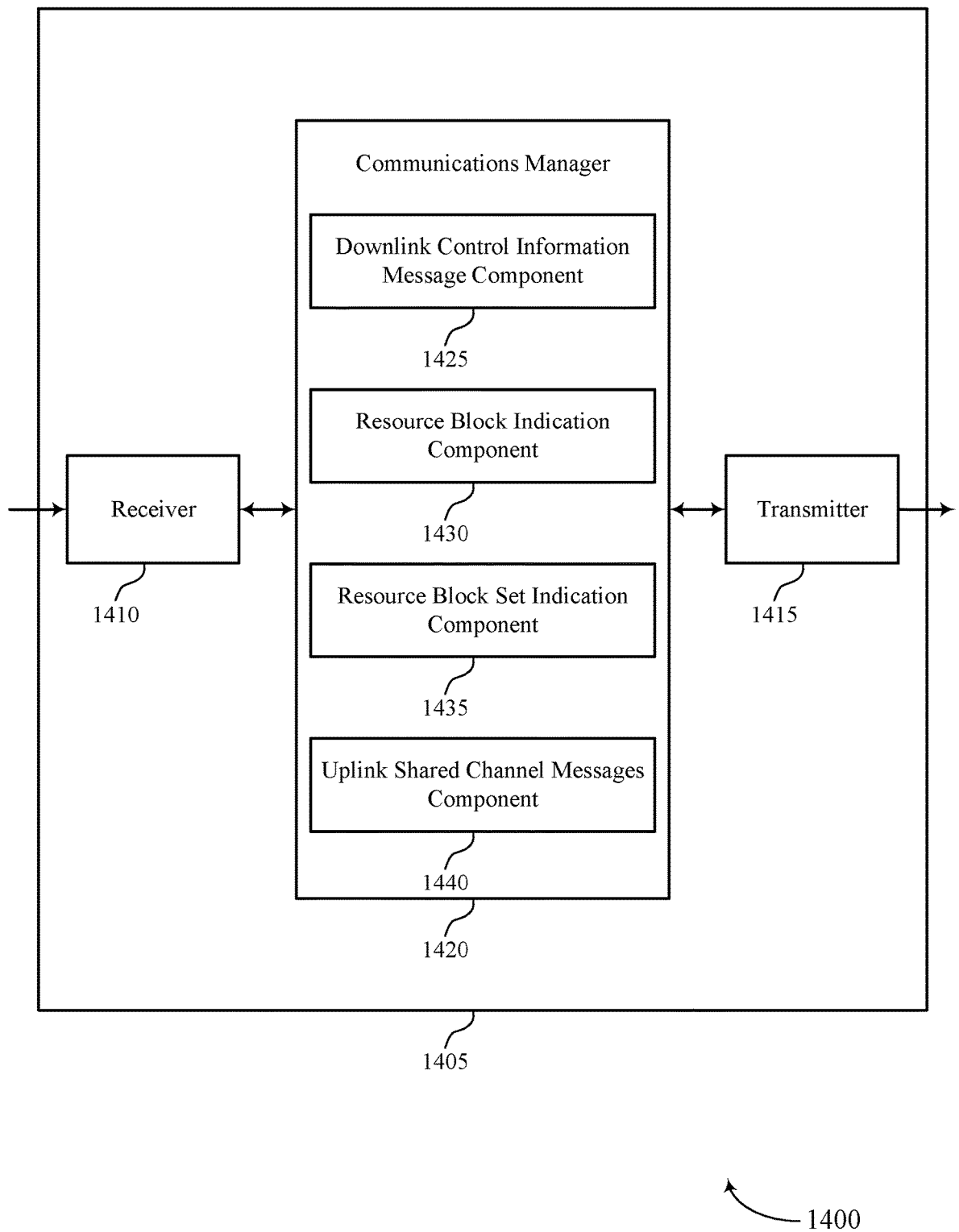

FIG. 14 shows a block diagram 1400 of a device 1405 that supports uplink shared channel resource allocation for multi-cell scheduling in accordance with one or more aspects of the present disclosure. The device 1405 may be an example of aspects of a device 1305 or a network entity 105 as described herein. The device 1405 may include a receiver 1410, a transmitter 1415, and a communications manager 1420. The device 1405 may also include a processor. Each of these components may be in communication with one another (e.g., via one or more buses).

The receiver 1410 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1405. In some examples, the receiver 1410 may support obtaining information by receiving signals via one or more antennas. Additionally, or alternatively, the receiver 1410 may support obtaining information by receiving signals via one or more wired (e.g., electrical, fiber optic) interfaces, wireless interfaces, or any combination thereof.

The transmitter 1415 may provide a means for outputting (e.g., transmitting, providing, conveying, sending) information generated by other components of the device 1405. For example, the transmitter 1415 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1415 may support outputting information by transmitting signals via one or more antennas. Additionally, or alternatively, the transmitter 1415 may support outputting information by transmitting signals via one or more wired (e.g., electrical, fiber optic) interfaces, wireless interfaces, or any combination thereof. In some examples, the transmitter 1415 and the receiver 1410 may be co-located in a transceiver, which may include or be coupled with a modem.

The device 1405, or various components thereof, may be an example of means for performing various aspects of uplink shared channel resource allocation for multi-cell scheduling as described herein. For example, the communications manager 1420 may include a DCI message component 1425, a resource block indication component 1430, a resource block set indication component 1435, an uplink shared channel messages component 1440, or any combination thereof. The communications manager 1420 may be an example of aspects of a communications manager 1320 as described herein. In some examples, the communications manager 1420, or various components thereof, may be configured to perform various operations (e.g., receiving, obtaining, monitoring, outputting, transmitting) using or otherwise in cooperation with the receiver 1410, the transmitter 1415, or both. For example, the communications manager 1420 may receive information from the receiver 1410, send information to the transmitter 1415, or be integrated in combination with the receiver 1410, the transmitter 1415, or both to obtain information, output information, or perform various other operations as described herein.

The communications manager 1420 may support wireless communications at a first network entity in accordance with examples as disclosed herein. The DCI message component 1425 may be configured as or otherwise support a means for transmitting a DCI message indicating that uplink shared channel messages to at least the first network entity and a second network entity are scheduled in accordance with a resource allocation type. The resource block indication component 1430 may be configured as or otherwise support a means for transmitting a first set of bits indicative of one or more resource block indices based on the resource allocation type. The resource block set indication component 1435 may be configured as or otherwise support a means for transmitting a second set of bits indicative of one or more resource block set indices based on the resource allocation type. The uplink shared channel messages component 1440 may be configured as or otherwise support a means for receiving the uplink shared channel messages in accordance with the first set of bits and the second set of bits.

Figure 15:
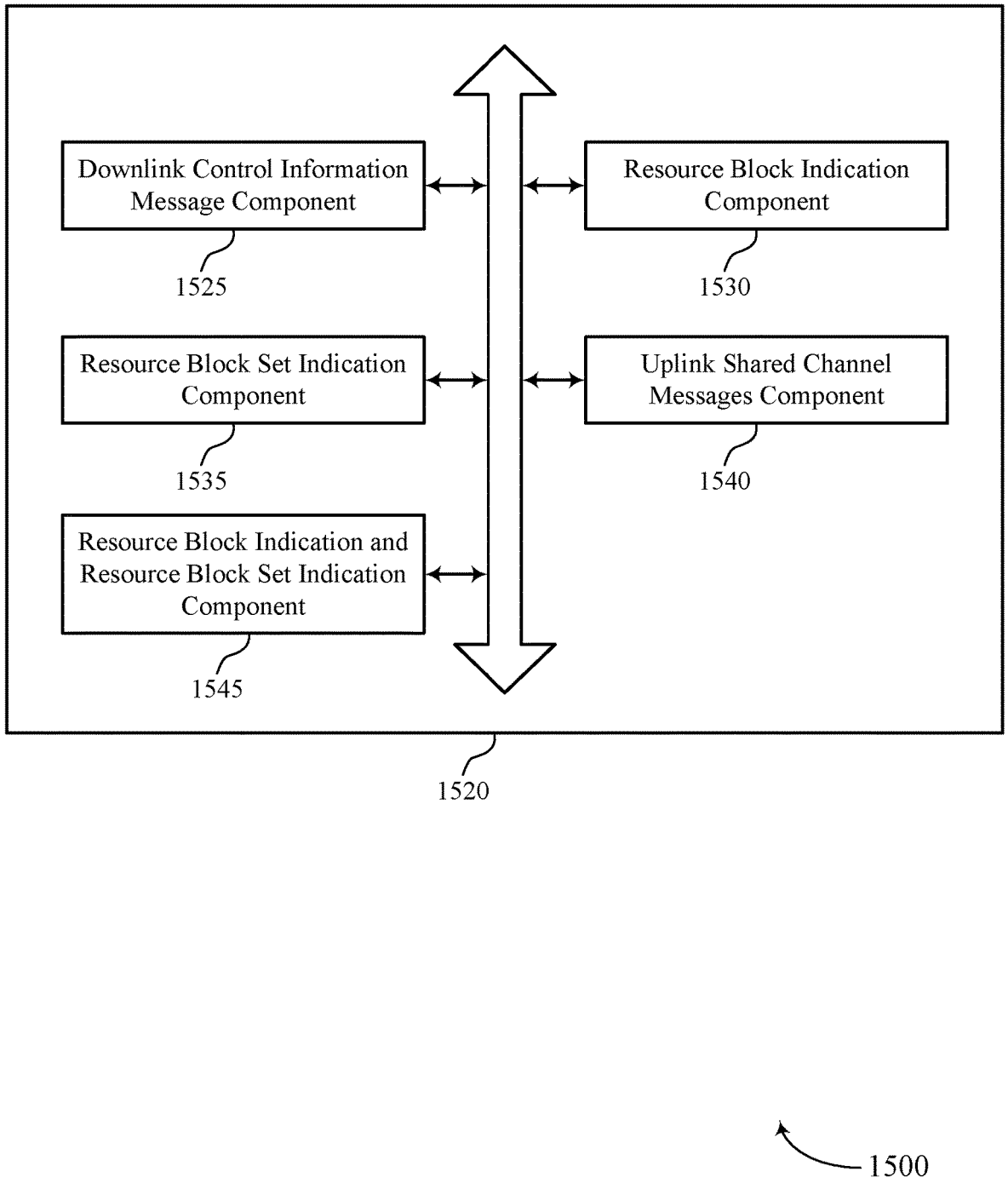
FIG. 15 shows a block diagram of a communications manager that supports uplink shared channel resource allocation for multi-cell scheduling in accordance with one or more aspects of the present disclosure.

FIG. 15 shows a block diagram 1500 of a communications manager 1520 that supports uplink shared channel resource allocation for multi-cell scheduling in accordance with one or more aspects of the present disclosure. The communications manager 1520 may be an example of aspects of a communications manager 1320, a communications manager 1420, or both, as described herein. The communications manager 1520, or various components thereof, may be an example of means for performing various aspects of uplink shared channel resource allocation for multi-cell scheduling as described herein. For example, the communications manager 1520 may include a DCI message component 1525, a resource block indication component 1530, a resource block set indication component 1535, an uplink shared channel messages component 1540, a resource block indication and resource block set indication component 1545, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1520 may support wireless communications at a first network entity in accordance with examples as disclosed herein. The DCI message component 1525 may be configured as or otherwise support a means for transmitting a DCI message indicating that uplink shared channel messages to at least the first network entity and a second network entity are scheduled in accordance with a resource allocation type. The resource block indication component 1530 may be configured as or otherwise support a means for transmitting a first set of bits indicative of one or more resource block indices based on the resource allocation type. The resource block set indication component 1535 may be configured as or otherwise support a means for transmitting a second set of bits indicative of one or more resource block set indices based on the resource allocation type. The uplink shared channel messages component 1540 may be configured as or otherwise support a means for receiving the uplink shared channel messages in accordance with the first set of bits and the second set of bits.

In some examples, to support transmitting the first set of bits, the resource block indication component 1530 may be configured as or otherwise support a means for transmitting the first set of bits that are commonly associated with at least the first network entity and the second network entity, where the one or more resource block indices are allocated for transmission of the uplink shared channel messages to at least the first network entity and the second network entity.

In some examples, an interlace pattern of the one or more resource block indices is different for the first network entity and the second network entity in accordance with the first set of bits that are commonly associated with at least the first network entity and the second network entity based on an alignment of a reference point being different for the first network entity and the second network entity, the reference point is for identifying resource block indices.

In some examples, to support transmitting the first set of bits, the resource block indication component 1530 may be configured as or otherwise support a means for transmitting the first set of bits including subsets of bits, where each subset of bits is associated with a different network entity, and where each subset of bits indicates a set of resource block indices associated with a corresponding network entity.

In some examples, the subsets of bits includes a first subset of bits associated with the first network entity and a second subset of bits associated with the second network entity based on the first network entity and the second network entity being different network entities.

In some examples, the first subset of bits indicates a first set of resource block indices allocated for transmission of the uplink shared channel messages to the first network entity and the second subset of bits indicates a second set of resource block indices allocated for transmission of the uplink shared channel messages to the second network entity.

In some examples, a number of the subsets of bits included in the first set of bits is based on a number of network entities configured to be scheduled by the DCI message.

In some examples, to support transmitting the first set of bits, the resource block indication component 1530 may be configured as or otherwise support a means for transmitting multiple first sets of bits, where each multiple is associated with a different network entity, and where each multiple indicates a set of resource block indices associated with a corresponding network entity.

In some examples, a number of multiples of the multiple first sets of bits is based on a number of network entities configured to be scheduled by the DCI message.

In some examples, to support transmitting the first set of bits, the resource block indication component 1530 may be configured as or otherwise support a means for transmitting the first set of bits including subsets of bits, where each subset of bits is associated with a different group of one or more network entities, and where each subset of bits indicates a set of resource block indices associated with a corresponding group of network entities.

In some examples, a number of subsets of bits included in the first set of bits is based on a number of groups of network entities configured to be scheduled by the DCI message.

In some examples, the first network entity and the second network entity are included in a same group of network entities or different groups of network entities.

In some examples, to support transmitting the second set of bits, the resource block set indication component 1535 may be configured as or otherwise support a means for transmitting the second set of bits that are commonly associated with at least the first network entity and the second network entity based on resource block indices being assigned to resource block sets per network entity, where the one or more resource block set indices are allocated for transmission of the uplink shared channel messages to at least the first network entity and the second network entity.

In some examples, a number of bits included in the second set of bits is based on a network entity of at least the first network entity and the second network entity being associated with a highest number of resource block sets.

In some examples, a resource block set configuration associated with the first network entity is different from a resource block set configuration associated with the second network entity based on intra-cell guard band configurations associated with the respective first and second network entities.

In some examples, each resource block set configuration is indicative of a starting common resource block index and a number of common resource blocks associated with each resource block set, the starting common resource block index, the number of common resource blocks, or both being different for one or more of the resource block sets configured for the first network entity and the second network entity.

In some examples, to support transmitting the second set of bits, the resource block set indication component 1535 may be configured as or otherwise support a means for transmitting the second set of bits including subsets of bits, where each subset of bits is associated with a different network entity, and where each subset of bits indicates a set of resource block set indices associated with a corresponding network entity.

In some examples, the subsets of bits includes a first subset of bits associated with the first network entity and a second subset of bits associated with the second network entity based on the first network entity and the second network entity being different network entities.

In some examples, the first subset of bits indicates a first set of resource block set indices allocated for transmission of the uplink shared channel messages to the first network entity and the second subset of bits indicates a second set of resource block set indices allocated for transmission of the uplink shared channel messages to the second network entity.

In some examples, a number of the subsets of bits included in the first set of bits is based on a number of network entities configured to be scheduled by the DCI message.

In some examples, to support transmitting the second set of bits, the resource block set indication component 1535 may be configured as or otherwise support a means for transmitting multiple second sets of bits, where each multiple is associated with a different network entity, and where each multiple indicates a set of resource block set indices associated with a corresponding network entity.

In some examples, a number of multiples of the multiple second sets of bits is based on a number of network entities configured to be scheduled by the DCI message.

In some examples, to support transmitting the second set of bits, the resource block set indication component 1535 may be configured as or otherwise support a means for transmitting the second set of bits including subsets of bits, where each subset of bits is associated with a different group of one or more network entities, and where each subset of bits indicates a set of resource block indices associated with a corresponding group of network entities.

In some examples, a number of subsets of bits included in the second set of bits is based on a number of groups of network entities configured to be scheduled by the DCI message.

In some examples, the first network entity and the second network entity are included in a same group of network entities or different groups of network entities.

In some examples, to support transmitting the second set of bits, the resource block set indication component 1535 may be configured as or otherwise support a means for transmitting the second set of bits that are commonly associated with at least the first network entity and the second network entity based on resource block set indices being assigned to resource block sets across at least the first network entity and the second network entity, where each bit in the second set of bits corresponds to a different resource block set index.

In some examples, the second set of bits indicates that consecutive resource block sets associated with the first network entity are scheduled by the DCI message, and the resource block set indication component 1535 may be configured as or otherwise support a means for identifying that resource blocks between the consecutive resource block sets are scheduled for the uplink shared channel messages based on the consecutive resource block sets being associated with a same network entity.

In some examples, the second set of bits indicates that a first resource block set associated with the first network entity and a consecutive resource block set associated with the second network entity are scheduled by the DCI message, and the resource block set indication component 1535 may be configured as or otherwise support a means for identifying that resource blocks between the first resource block set and the consecutive resource block set are unscheduled for the uplink shared channel messages based on the first resource block set and the consecutive resource block set being associated with different network entities.

In some examples, a number of bits included in the second set of bits is based on a number of resource block sets allocated across at least the first network entity and the second network entity.

In some examples, to support transmitting the first set of bits and the second set of bits, the resource block indication and resource block set indication component 1545 may be configured as or otherwise support a means for transmitting a message including the first set of bits and the second set of bits.

In some examples, the message is the DCI message.

In some examples, a format of the DCI message is based on the DCI message scheduling the uplink shared channel messages to at least the first network entity and the second network entity in accordance with the resource allocation type.

In some examples, a number of bits included in the first set of bits is based on a subcarrier spacing associated with the one or more resource blocks.

Figure 16:
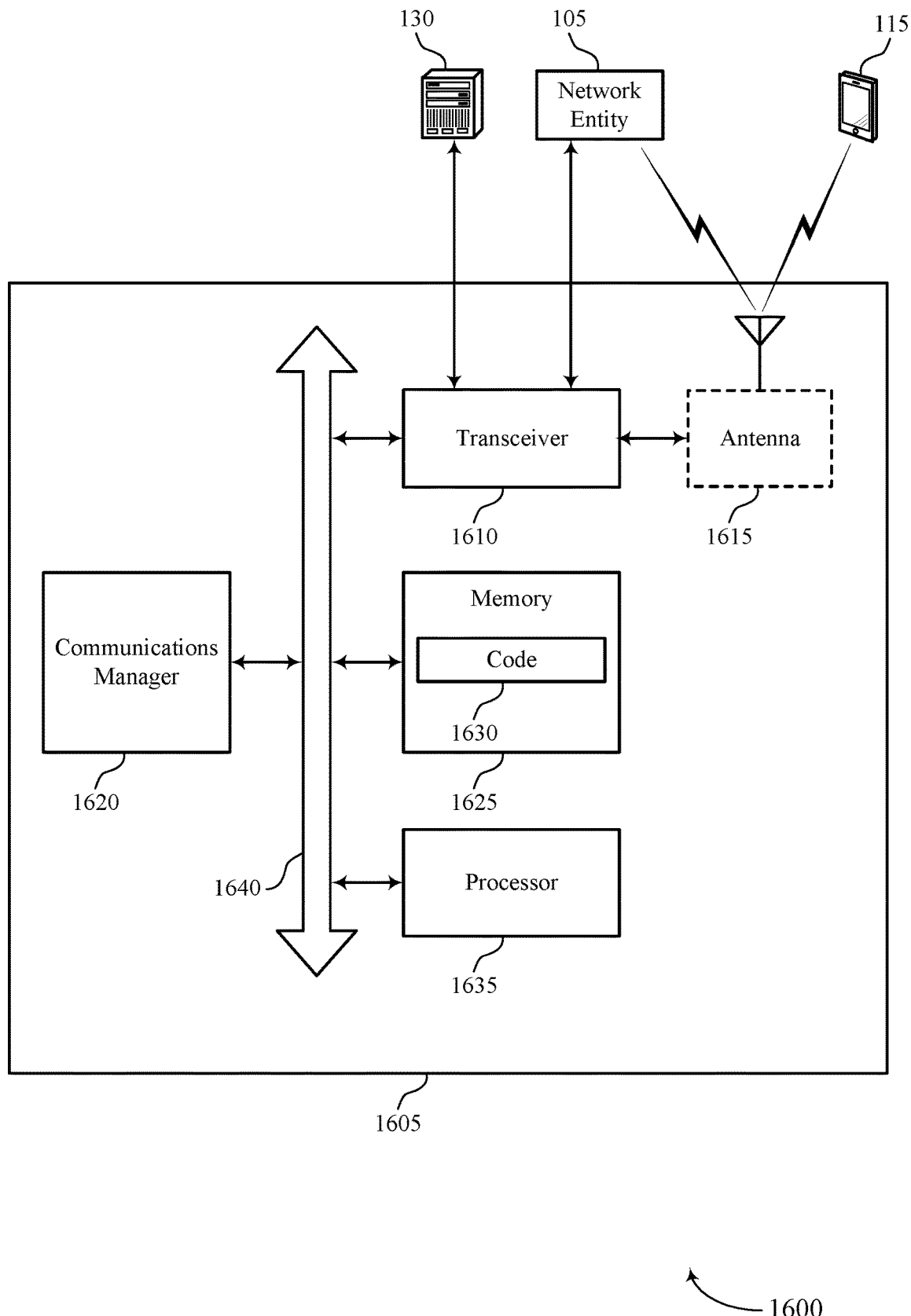
FIG. 16 shows a diagram of a system including a device that supports uplink shared channel resource allocation for multi-cell scheduling in accordance with one or more aspects of the present disclosure.

FIG. 16 shows a diagram of a system 1600 including a device 1605 that supports uplink shared channel resource allocation for multi-cell scheduling in accordance with one or more aspects of the present disclosure. The device 1605 may be an example of or include the components of a device 1305, a device 1405, or a network entity 105 as described herein. The device 1605 may communicate with one or more network entities 105, one or more UEs 115, or any combination thereof, which may include communications over one or more wired interfaces, over one or more wireless interfaces, or any combination thereof. The device 1605 may include components that support outputting and obtaining communications, such as a communications manager 1620, a transceiver 1610, an antenna 1615, a memory 1625, code 1630, and a processor 1635. These components may be in electronic communication or otherwise coupled (e.g., operatively, communicatively, functionally, electronically, electrically) via one or more buses (e.g., a bus 1640).

The transceiver 1610 may support bi-directional communications via wired links, wireless links, or both as described herein. In some examples, the transceiver 1610 may include a wired transceiver and may communicate bi-directionally with another wired transceiver. Additionally, or alternatively, in some examples, the transceiver 1610 may include a wireless transceiver and may communicate bi-directionally with another wireless transceiver. In some examples, the device 1605 may include one or more antennas 1615, which may be capable of transmitting or receiving wireless transmissions (e.g., concurrently). The transceiver 1610 may also include a modem to modulate signals, to provide the modulated signals for transmission (e.g., by one or more antennas 1615, by a wired transmitter), to receive modulated signals (e.g., from one or more antennas 1615, from a wired receiver), and to demodulate signals. In some implementations, the transceiver 1610 may include one or more interfaces, such as one or more interfaces coupled with the one or more antennas 1615 that are configured to support various receiving or obtaining operations, or one or more interfaces coupled with the one or more antennas 1615 that are configured to support various transmitting or outputting operations, or a combination thereof. In some implementations, the transceiver 1610 may include or be configured for coupling with one or more processors or memory components that are operable to perform or support operations based on received or obtained information or signals, or to generate information or other signals for transmission or other outputting, or any combination thereof. In some implementations, the transceiver 1610, or the transceiver 1610 and the one or more antennas 1615, or the transceiver 1610 and the one or more antennas 1615 and one or more processors or memory components (for example, the processor 1635, or the memory 1625, or both), may be included in a chip or chip assembly that is installed in the device 1605. In some examples, the transceiver may be operable to support communications via one or more communications links (e.g., a communication link 125, a backhaul communication link 120, a midhaul communication link 162, a fronthaul communication link 168).

The memory 1625 may include RAM and ROM. The memory 1625 may store computer-readable, computer-executable code 1630 including instructions that, when executed by the processor 1635, cause the device 1605 to perform various functions described herein. The code 1630 may be stored in a non-transitory computer-readable medium such as system memory or another type of memory. In some cases, the code 1630 may not be directly executable by the processor 1635 but may cause a computer (e.g., when compiled and executed) to perform functions described herein. In some cases, the memory 1625 may contain, among other things, a BIOS which may control basic hardware or software operation such as the interaction with peripheral components or devices.

The processor 1635 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1635 may be configured to operate a memory array using a memory controller. In some other cases, a memory controller may be integrated into the processor 1635. The processor 1635 may be configured to execute computer-readable instructions stored in a memory (e.g., the memory 1625) to cause the device 1605 to perform various functions (e.g., functions or tasks supporting uplink shared channel resource allocation for multi-cell scheduling). For example, the device 1605 or a component of the device 1605 may include a processor 1635 and memory 1625 coupled with the processor 1635, the processor 1635 and memory 1625 configured to perform various functions described herein. The processor 1635 may be an example of a cloud-computing platform (e.g., one or more physical nodes and supporting software such as operating systems, virtual machines, or container instances) that may host the functions (e.g., by executing code 1630) to perform the functions of the device 1605. The processor 1635 may be any one or more suitable processors capable of executing scripts or instructions of one or more software programs stored in the device 1605 (such as within the memory 1625). In some implementations, the processor 1635 may be a component of a processing system. A processing system may generally refer to a system or series of machines or components that receives inputs and processes the inputs to produce a set of outputs (which may be passed to other systems or components of, for example, the device 1605). For example, a processing system of the device 1605 may refer to a system including the various other components or subcomponents of the device 1605, such as the processor 1635, or the transceiver 1610, or the communications manager 1620, or other components or combinations of components of the device 1605. The processing system of the device 1605 may interface with other components of the device 1605, and may process information received from other components (such as inputs or signals) or output information to other components. For example, a chip or modem of the device 1605 may include a processing system and one or more interfaces to output information, or to obtain information, or both. The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 1605 may transmit information output from the chip or modem. Additionally, or alternatively, in some implementations, the one or more interfaces may refer to an interface between the processing system of the chip or modem and a receiver, such that the device 1605 may obtain information or signal inputs, and the information may be passed to the processing system. A person having ordinary skill in the art will readily recognize that a first interface also may obtain information or signal inputs, and a second interface also may output information or signal outputs.

In some examples, a bus 1640 may support communications of (e.g., within) a protocol layer of a protocol stack. In some examples, a bus 1640 may support communications associated with a logical channel of a protocol stack (e.g., between protocol layers of a protocol stack), which may include communications performed within a component of the device 1605, or between different components of the device 1605 that may be co-located or located in different locations (e.g., where the device 1605 may refer to a system in which one or more of the communications manager 1620, the transceiver 1610, the memory 1625, the code 1630, and the processor 1635 may be located in one of the different components or divided between different components).

In some examples, the communications manager 1620 may manage aspects of communications with a core network 130 (e.g., via one or more wired or wireless backhaul links). For example, the communications manager 1620 may manage the transfer of data communications for client devices, such as one or more UEs 115. In some examples, the communications manager 1620 may manage communications with other network entities 105, and may include a controller or scheduler for controlling communications with UEs 115 in cooperation with other network entities 105. In some examples, the communications manager 1620 may support an X2 interface within an LTE/LTE-A wireless communications network technology to provide communication between network entities 105.

The communications manager 1620 may support wireless communications at a first network entity in accordance with examples as disclosed herein. For example, the communications manager 1620 may be configured as or otherwise support a means for transmitting a DCI message indicating that uplink shared channel messages to at least the first network entity and a second network entity are scheduled in accordance with a resource allocation type. The communications manager 1620 may be configured as or otherwise support a means for transmitting a first set of bits indicative of one or more resource block indices based on the resource allocation type. The communications manager 1620 may be configured as or otherwise support a means for transmitting a second set of bits indicative of one or more resource block set indices based on the resource allocation type. The communications manager 1620 may be configured as or otherwise support a means for receiving the uplink shared channel messages in accordance with the first set of bits and the second set of bits.

By including or configuring the communications manager 1620 in accordance with examples as described herein, the device 1605 may support techniques for support uplink shared channel resource allocation for multi-cell scheduling, which may result in improved communication reliability, reduced latency, improved user experience related to reduced processing, reduced power consumption, more efficient utilization of communication resources, improved coordination between devices, longer battery life, or improved utilization of processing capability.

In some examples, the communications manager 1620 may be configured to perform various operations (e.g., receiving, obtaining, monitoring, outputting, transmitting) using or otherwise in cooperation with the transceiver 1610, the one or more antennas 1615 (e.g., where applicable), or any combination thereof. Although the communications manager 1620 is illustrated as a separate component, in some examples, one or more functions described with reference to the communications manager 1620 may be supported by or performed by the transceiver 1610, the processor 1635, the memory 1625, the code 1630, or any combination thereof. For example, the code 1630 may include instructions executable by the processor 1635 to cause the device 1605 to perform various aspects of uplink shared channel resource allocation for multi-cell scheduling as described herein, or the processor 1635 and the memory 1625 may be otherwise configured to perform or support such operations.

Figure 17:
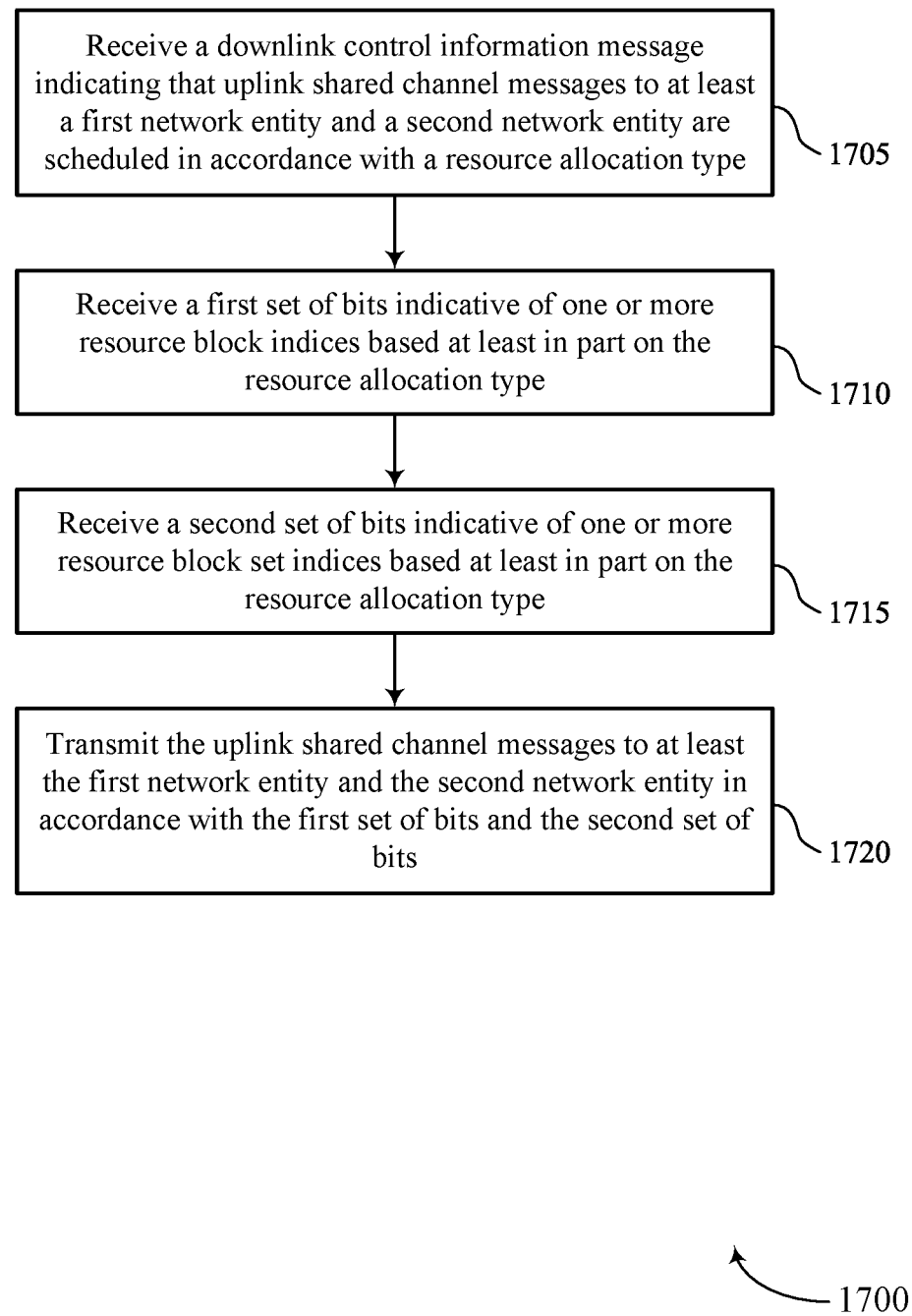
FIGS. 17 through 20 show flowcharts illustrating methods that support uplink shared channel resource allocation for multi-cell scheduling in accordance with one or more aspects of the present disclosure.

FIG. 17 shows a flowchart illustrating a method 1700 that supports uplink shared channel resource allocation for multi-cell scheduling in accordance with one or more aspects of the present disclosure. The operations of the method 1700 may be implemented by a UE or its components as described herein. For example, the operations of the method 1700 may be performed by a UE 115 as described with reference to FIGS. 1 through 12. In some examples, a UE may execute a set of instructions to control the functional elements of the UE to perform the described functions. Additionally, or alternatively, the UE may perform aspects of the described functions using special-purpose hardware.

At 1705, the method may include receiving a DCI message indicating that uplink shared channel messages to at least a first network entity and a second network entity are scheduled in accordance with a resource allocation type. The operations of 1705 may be performed in accordance with examples as disclosed herein. In some examples, aspects of the operations of 1705 may be performed by a DCI message component 1125 as described with reference to FIG. 11.

At 1710, the method may include receiving a first set of bits indicative of one or more resource block indices based on the resource allocation type. The operations of 1710 may be performed in accordance with examples as disclosed herein. In some examples, aspects of the operations of 1710 may be performed by a resource block indication component 1130 as described with reference to FIG. 11.

At 1715, the method may include receiving a second set of bits indicative of one or more resource block set indices based on the resource allocation type. The operations of 1715 may be performed in accordance with examples as disclosed herein. In some examples, aspects of the operations of 1715 may be performed by a resource block set indication component 1135 as described with reference to FIG. 11.

At 1720, the method may include transmitting the uplink shared channel messages to at least the first network entity and the second network entity in accordance with the first set of bits and the second set of bits. The operations of 1720 may be performed in accordance with examples as disclosed herein. In some examples, aspects of the operations of 1720 may be performed by an uplink shared channel messages component 1140 as described with reference to FIG. 11.

Figure 18:
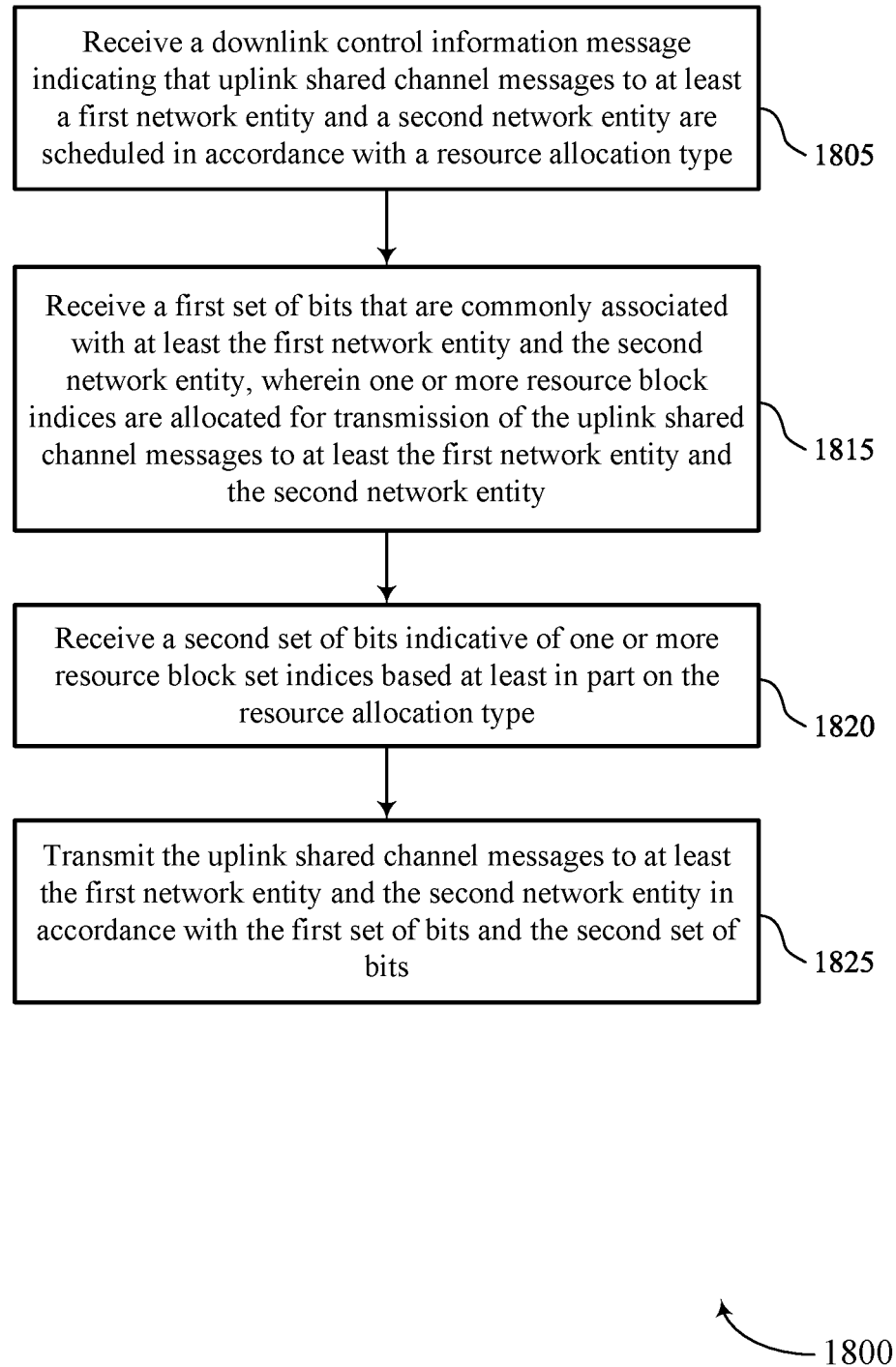

FIG. 18 shows a flowchart illustrating a method 1800 that supports uplink shared channel resource allocation for multi-cell scheduling in accordance with one or more aspects of the present disclosure. The operations of the method 1800 may be implemented by a UE or its components as described herein. For example, the operations of the method 1800 may be performed by a UE 115 as described with reference to FIGS. 1 through 12. In some examples, a UE may execute a set of instructions to control the functional elements of the UE to perform the described functions. Additionally, or alternatively, the UE may perform aspects of the described functions using special-purpose hardware.

At 1805, the method may include receiving a DCI message indicating that uplink shared channel messages to at least a first network entity and a second network entity are scheduled in accordance with a resource allocation type. The operations of 1805 may be performed in accordance with examples as disclosed herein. In some examples, aspects of the operations of 1805 may be performed by a DCI message component 1125 as described with reference to FIG. 11.

At 1815, the method may include receiving the first set of bits that are commonly associated with at least the first network entity and the second network entity, where the one or more resource block indices are allocated for transmission of the uplink shared channel messages to at least the first network entity and the second network entity. The operations of 1815 may be performed in accordance with examples as disclosed herein. In some examples, aspects of the operations of 1815 may be performed by a resource block indication component 1130 as described with reference to FIG. 11.

At 1820, the method may include receiving a second set of bits indicative of one or more resource block set indices based on the resource allocation type. The operations of 1820 may be performed in accordance with examples as disclosed herein. In some examples, aspects of the operations of 1820 may be performed by a resource block set indication component 1135 as described with reference to FIG. 11.

At 1825, the method may include transmitting the uplink shared channel messages to at least the first network entity and the second network entity in accordance with the first set of bits and the second set of bits. The operations of 1825 may be performed in accordance with examples as disclosed herein. In some examples, aspects of the operations of 1825 may be performed by an uplink shared channel messages component 1140 as described with reference to FIG. 11.

Figure 19:
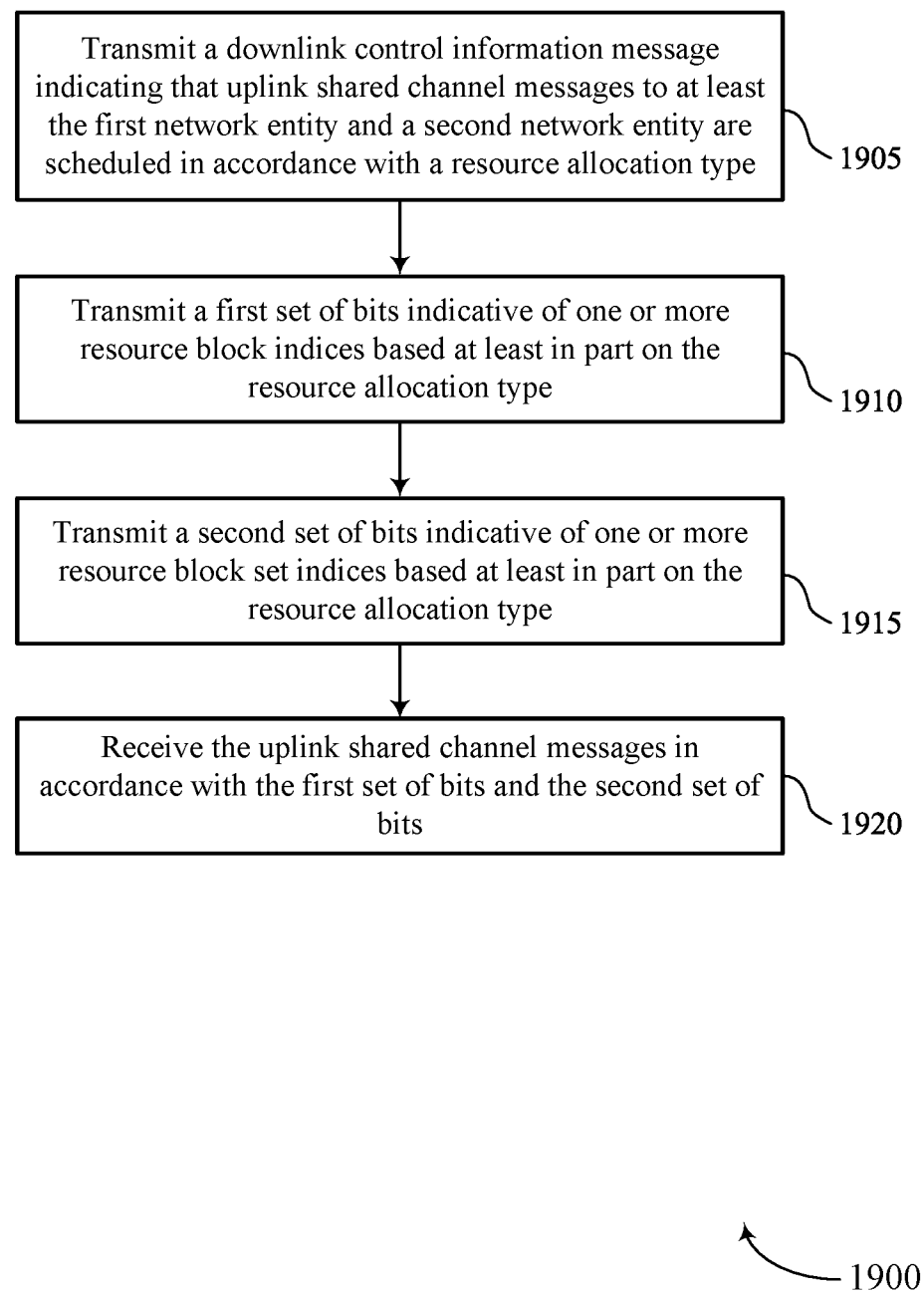

FIG. 19 shows a flowchart illustrating a method 1900 that supports uplink shared channel resource allocation for multi-cell scheduling in accordance with one or more aspects of the present disclosure. The operations of the method 1900 may be implemented by a network entity or its components as described herein. For example, the operations of the method 1900 may be performed by a network entity as described with reference to FIGS. 1 through 8 and 13 through 16. In some examples, a network entity may execute a set of instructions to control the functional elements of the network entity to perform the described functions. Additionally, or alternatively, the network entity may perform aspects of the described functions using special-purpose hardware.

At 1905, the method may include transmitting a DCI message indicating that uplink shared channel messages to at least the first network entity and a second network entity are scheduled in accordance with a resource allocation type. The operations of 1905 may be performed in accordance with examples as disclosed herein. In some examples, aspects of the operations of 1905 may be performed by a DCI message component 1525 as described with reference to FIG. 15.

At 1910, the method may include transmitting a first set of bits indicative of one or more resource block indices based on the resource allocation type. The operations of 1910 may be performed in accordance with examples as disclosed herein. In some examples, aspects of the operations of 1910 may be performed by a resource block indication component 1530 as described with reference to FIG. 15.

At 1915, the method may include transmitting a second set of bits indicative of one or more resource block set indices based on the resource allocation type. The operations of 1915 may be performed in accordance with examples as disclosed herein. In some examples, aspects of the operations of 1915 may be performed by a resource block set indication component 1535 as described with reference to FIG. 15.

At 1920, the method may include receiving the uplink shared channel messages in accordance with the first set of bits and the second set of bits. The operations of 1920 may be performed in accordance with examples as disclosed herein. In some examples, aspects of the operations of 1920 may be performed by an uplink shared channel messages component 1540 as described with reference to FIG. 15.

Figure 20:
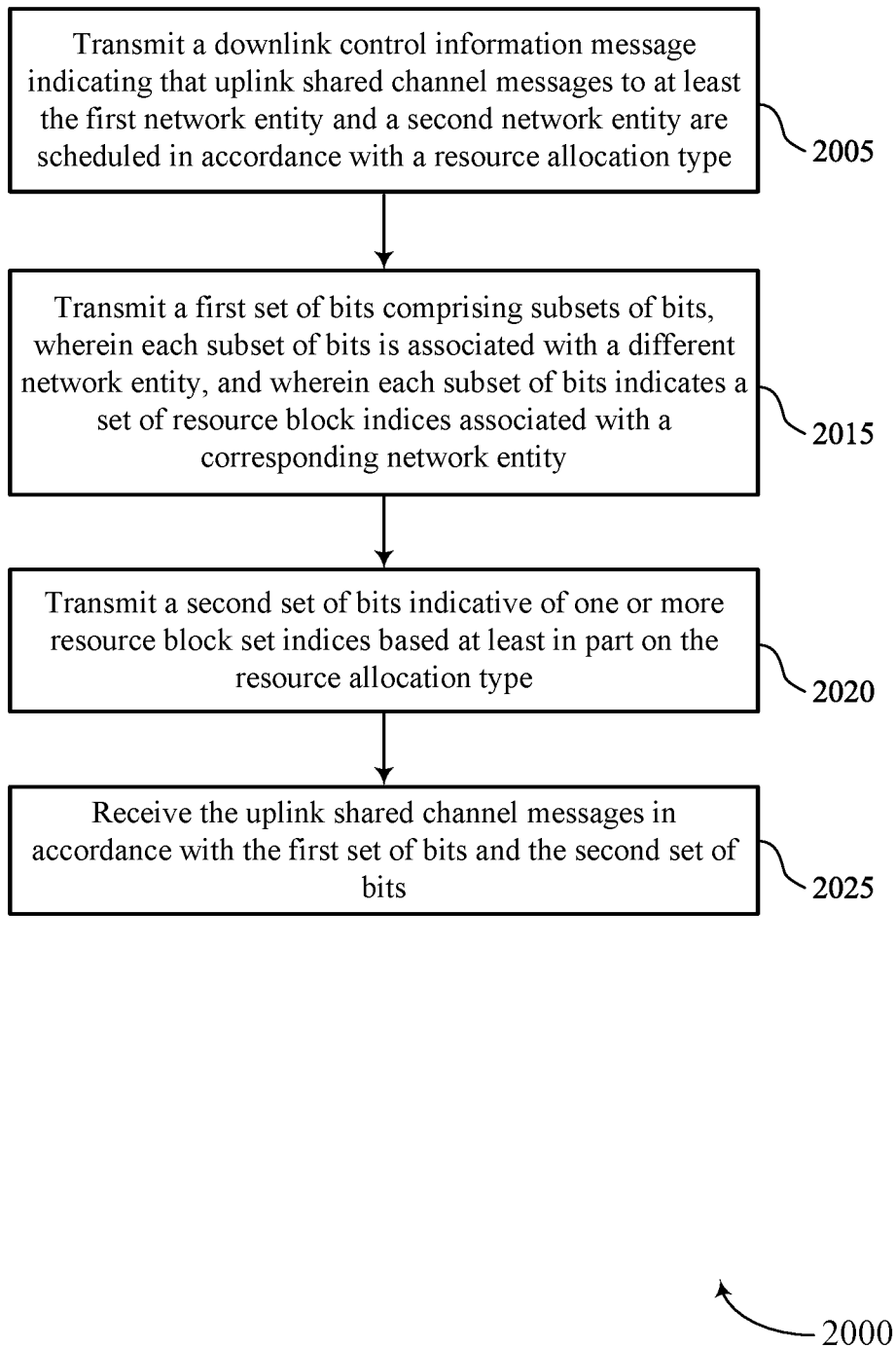

FIG. 20 shows a flowchart illustrating a method 2000 that supports uplink shared channel resource allocation for multi-cell scheduling in accordance with one or more aspects of the present disclosure. The operations of the method 2000 may be implemented by a network entity or its components as described herein. For example, the operations of the method 2000 may be performed by a network entity as described with reference to FIGS. 1 through 8 and 13 through 16. In some examples, a network entity may execute a set of instructions to control the functional elements of the network entity to perform the described functions. Additionally, or alternatively, the network entity may perform aspects of the described functions using special-purpose hardware.

At 2005, the method may include transmitting a DCI message indicating that uplink shared channel messages to at least the first network entity and a second network entity are scheduled in accordance with a resource allocation type. The operations of 2005 may be performed in accordance with examples as disclosed herein. In some examples, aspects of the operations of 2005 may be performed by a DCI message component 1525 as described with reference to FIG. 15.

At 2015, the method may include transmitting the first set of bits including subsets of bits, where each subset of bits is associated with a different network entity, and where each subset of bits indicates a set of resource block indices associated with a corresponding network entity. The operations of 2015 may be performed in accordance with examples as disclosed herein. In some examples, aspects of the operations of 2015 may be performed by a resource block indication component 1530 as described with reference to FIG. 15.

At 2020, the method may include transmitting a second set of bits indicative of one or more resource block set indices based on the resource allocation type. The operations of 2020 may be performed in accordance with examples as disclosed herein. In some examples, aspects of the operations of 2020 may be performed by a resource block set indication component 1535 as described with reference to FIG. 15.

At 2025, the method may include receiving the uplink shared channel messages in accordance with the first set of bits and the second set of bits. The operations of 2025 may be performed in accordance with examples as disclosed herein. In some examples, aspects of the operations of 2025 may be performed by an uplink shared channel messages component 1540 as described with reference to FIG. 15.

The following provides an overview of aspects of the present disclosure:

Aspect 1: A method for wireless communications at a UE, comprising: receiving a downlink control information message indicating that uplink shared channel messages to at least a first network entity and a second network entity are scheduled in accordance with a resource allocation type; receiving a first set of bits indicative of one or more resource block indices based at least in part on the resource allocation type; receiving a second set of bits indicative of one or more resource block set indices based at least in part on the resource allocation type; and transmitting the uplink shared channel messages to at least the first network entity and the second network entity in accordance with the first set of bits and the second set of bits.

Aspect 2: The method of aspect 1, wherein receiving the first set of bits comprises: receiving the first set of bits that are commonly associated with at least the first network entity and the second network entity, wherein the one or more resource block indices are allocated for transmission of the uplink shared channel messages to at least the first network entity and the second network entity.

Aspect 3: The method of aspect 2, wherein an interlace pattern of the one or more resource block indices is different for the first network entity and the second network entity in accordance with the first set of bits that are commonly associated with at least the first network entity and the second network entity based at least in part on an alignment of a reference point being different for the first network entity and the second network entity, the reference point is for identifying resource block indices.

Aspect 4: The method of any of aspects 1 through 3, wherein receiving the first set of bits comprises: receiving the first set of bits comprising subsets of bits, wherein each subset of bits is associated with a different network entity, and wherein each subset of bits indicates a set of resource block indices associated with a corresponding network entity.

Aspect 5: The method of aspect 4, wherein the subsets of bits comprises a first subset of bits associated with the first network entity and a second subset of bits associated with the second network entity based at least in part on the first network entity and the second network entity being different network entities.

Aspect 6: The method of aspect 5, wherein the first subset of bits indicates a first set of resource block indices allocated for transmission of the uplink shared channel messages to the first network entity and the second subset of bits indicates a second set of resource block indices allocated for transmission of the uplink shared channel messages to the second network entity.

Aspect 7: The method of any of aspects 4 through 6, wherein a number of the subsets of bits included in the first set of bits is based at least in part on a number of network entities configured to be scheduled by the downlink control information message.

Aspect 8: The method of any of aspects 1 through 7, wherein receiving the second set of bits comprises: receiving multiple first sets of bits, wherein each multiple is associated with a different network entity, and wherein each multiple indicates a set of resource block indices associated with a corresponding network entity.

Aspect 9: The method of aspect 8, wherein a number of multiples of the multiple first sets of bits is based at least in part on a number of network entities configured to be scheduled by the downlink control information message.

Aspect 10: The method of any of aspects 1 through 9, wherein receiving the first set of bits comprises: receiving the first set of bits comprising subsets of bits, wherein each subset of bits is associated with a different group of one or more network entities, and wherein each subset of bits indicates a set of resource block indices associated with a corresponding group of network entities.

Aspect 11: The method of aspect 10, wherein a number of subsets of bits included in the first set of bits is based at least in part on a number of groups of network entities configured to be scheduled by the downlink control information message.

Aspect 12: The method of any of aspects 10 through 11, wherein the first network entity and the second network entity are included in a same group of network entities or different groups of network entities.

Aspect 13: The method of any of aspects 1 through 12, wherein receiving the second set of bits comprises: receiving the second set of bits that are commonly associated with at least the first network entity and the second network entity based at least in part on resource block indices being assigned to resource block sets per network entity, wherein the one or more resource block set indices are allocated for transmission of the uplink shared channel messages to at least the first network entity and the second network entity.

Aspect 14: The method of aspect 13, wherein a number of bits included in the second set of bits is based at least in part on a network entity of at least the first network entity and the second network entity being associated with a highest number of resource block sets.

Aspect 15: The method of any of aspects 13 through 14, wherein a resource block set configuration associated with the first network entity is different from a resource block set configuration associated with the second network entity based at least in part on intra-cell guard band configurations associated with the respective first and second network entities.

Aspect 16: The method of aspect 15, wherein each resource block set configuration is indicative of a starting common resource block index and a number of common resource blocks associated with each resource block set, the starting common resource block index, the number of common resource blocks, or both being different for one or more of the resource block sets configured for the first network entity and the second network entity.

Aspect 17: The method of any of aspects 1 through 16, wherein receiving the second set of bits comprises: receiving the second set of bits comprising subsets of bits, wherein each subset of bits is associated with a different network entity, and wherein each subset of bits indicates a set of resource block set indices associated with a corresponding network entity.

Aspect 18: The method of aspect 17, wherein the subsets of bits comprises a first subset of bits associated with the first network entity and a second subset of bits associated with the second network entity based at least in part on the first network entity and the second network entity being different network entities.

Aspect 19: The method of aspect 18, wherein the first subset of bits indicates a first set of resource block set indices allocated for transmission of the uplink shared channel messages to the first network entity and the second subset of bits indicates a second set of resource block set indices allocated for transmission of the uplink shared channel messages to the first network entity.

Aspect 20: The method of any of aspects 17 through 19, wherein a number of the subsets of bits included in the first set of bits is based at least in part on a number of network entities configured to be scheduled by the downlink control information message.

Aspect 21: The method of any of aspects 1 through 20, wherein receiving the second set of bits comprises: receiving multiple second sets of bits, wherein each multiple is associated with a different network entity, and wherein each multiple indicates a set of resource block set indices associated with a corresponding network entity.

Aspect 22: The method of aspect 21, wherein a number of multiples of the multiple second sets of bits is based at least in part on a number of network entities configured to be scheduled by the downlink control information message.

Aspect 23: The method of any of aspects 1 through 22, wherein receiving the second set of bits comprises: receiving the second set of bits comprising subsets of bits, wherein each subset of bits is associated with a different group of one or more network entities, and wherein each subset of bits indicates a set of resource block indices associated with a corresponding group of network entities.

Aspect 24: The method of aspect 23, wherein a number of subsets of bits included in the second set of bits is based at least in part on a number of groups of network entities configured to be scheduled by the downlink control information message.

Aspect 25: The method of any of aspects 23 through 24, wherein the first network entity and the second network entity are included in a same group of network entities or different groups of network entities.

Aspect 26: The method of any of aspects 1 through 25, wherein receiving the second set of bits comprises: receiving the second set of bits that are commonly associated with at least the first network entity and the second network entity based at least in part on resource block set indices being assigned to resource block sets across at least the first network entity and the second network entity, wherein each bit in the second set of bits corresponds to a different resource block set index.

Aspect 27: The method of aspect 26, wherein the second set of bits indicates that consecutive resource block sets associated with the first network entity are scheduled by the downlink control information message, the method further comprising: identifying that resource blocks between the consecutive resource block sets are scheduled for the uplink shared channel messages based at least in part on the consecutive resource block sets being associated with a same network entity.

Aspect 28: The method of any of aspects 26 through 27, wherein the second set of bits indicates that a first resource block set associated with the first network entity and a consecutive resource block set associated with the second network entity are scheduled by the downlink control information message, the method further comprising: identifying that resource blocks between the first resource block set and the consecutive resource block set are unscheduled for the uplink shared channel messages based at least in part on the first resource block set and the consecutive resource block set being associated with different network entities.

Aspect 29: The method of any of aspects 26 through 28, wherein a number of bits included in the second set of bits is based at least in part on a number of resource block sets allocated across at least the first network entity and the second network entity.

Aspect 30: The method of any of aspects 1 through 29, wherein receiving the first set of bits and the second set of bits comprises: receiving a message comprising the first set of bits and the second set of bits.

Aspect 31: The method of aspect 30, wherein the message is the downlink control information message.

Aspect 32: The method of any of aspects 1 through 31, wherein a format of the downlink control information message is based at least in part on the downlink control information message scheduling the uplink shared channel messages to at least the first network entity and the second network entity in accordance with the resource allocation type.

Aspect 33: The method of any of aspects 1 through 32, wherein a number of bits included in the first set of bits is based at least in part on a subcarrier spacing associated with the one or more resource blocks.

Aspect 34: A method for wireless communications at a first network entity, comprising: transmitting a downlink control information message indicating that uplink shared channel messages to at least the first network entity and a second network entity are scheduled in accordance with a resource allocation type; transmitting a first set of bits indicative of one or more resource block indices based at least in part on the resource allocation type; transmitting a second set of bits indicative of one or more resource block set indices based at least in part on the resource allocation type; and receiving the uplink shared channel messages in accordance with the first set of bits and the second set of bits.

Aspect 35: The method of aspect 34, wherein transmitting the first set of bits comprises: transmitting the first set of bits that are commonly associated with at least the first network entity and the second network entity, wherein the one or more resource block indices are allocated for transmission of the uplink shared channel messages to at least the first network entity and the second network entity.

Aspect 36: The method of aspect 35, wherein an interlace pattern of the one or more resource block indices is different for the first network entity and the second network entity in accordance with the first set of bits that are commonly associated with at least the first network entity and the second network entity based at least in part on an alignment of a reference point being different for the first network entity and the second network entity, the reference point is for identifying resource block indices.

Aspect 37: The method of any of aspects 34 through 36, wherein transmitting the first set of bits comprises: transmitting the first set of bits comprising subsets of bits, wherein each subset of bits is associated with a different network entity, and wherein each subset of bits indicates a set of resource block indices associated with a corresponding network entity.

Aspect 38: The method of aspect 37, wherein the subsets of bits comprises a first subset of bits associated with the first network entity and a second subset of bits associated with the second network entity based at least in part on the first network entity and the second network entity being different network entities.

Aspect 39: The method of aspect 38, wherein the first subset of bits indicates a first set of resource block indices allocated for transmission of the uplink shared channel messages to the first network entity and the second subset of bits indicates a second set of resource block indices allocated for transmission of the uplink shared channel messages to the second network entity.

Aspect 40: The method of any of aspects 37 through 39, wherein a number of the subsets of bits included in the first set of bits is based at least in part on a number of network entities configured to be scheduled by the downlink control information message.

Aspect 41: The method of any of aspects 34 through 40, wherein transmitting the first set of bits comprises: transmitting multiple first sets of bits, wherein each multiple is associated with a different network entity, and wherein each multiple indicates a set of resource block indices associated with a corresponding network entity.

Aspect 42: The method of aspect 41, wherein a number of multiples of the multiple first sets of bits is based at least in part on a number of network entities configured to be scheduled by the downlink control information message.

Aspect 43: The method of any of aspects 34 through 42, wherein transmitting the first set of bits comprises: transmitting the first set of bits comprising subsets of bits, wherein each subset of bits is associated with a different group of one or more network entities, and wherein each subset of bits indicates a set of resource block indices associated with a corresponding group of network entities.

Aspect 44: The method of aspect 43, wherein a number of subsets of bits included in the first set of bits is based at least in part on a number of groups of network entities configured to be scheduled by the downlink control information message.

Aspect 45: The method of any of aspects 43 through 44, wherein the first network entity and the second network entity are included in a same group of network entities or different groups of network entities.

Aspect 46: The method of any of aspects 34 through 45, wherein transmitting the second set of bits comprises: transmitting the second set of bits that are commonly associated with at least the first network entity and the second network entity based at least in part on resource block indices being assigned to resource block sets per network entity, wherein the one or more resource block set indices are allocated for transmission of the uplink shared channel messages to at least the first network entity and the second network entity.

Aspect 47: The method of aspect 46, wherein a number of bits included in the second set of bits is based at least in part on a network entity of at least the first network entity and the second network entity being associated with a highest number of resource block sets.

Aspect 48: The method of any of aspects 46 through 47, wherein a resource block set configuration associated with the first network entity is different from a resource block set configuration associated with the second network entity based at least in part on intra-cell guard band configurations associated with the respective first and second network entities.

Aspect 49: The method of aspect 48, wherein each resource block set configuration is indicative of a starting common resource block index and a number of common resource blocks associated with each resource block set, the starting common resource block index, the number of common resource blocks, or both being different for one or more of the resource block sets configured for the first network entity and the second network entity.

Aspect 50: The method of any of aspects 34 through 49, wherein transmitting the second set of bits comprises: transmitting the second set of bits comprising subsets of bits, wherein each subset of bits is associated with a different network entity, and wherein each subset of bits indicates a set of resource block set indices associated with a corresponding network entity.

Aspect 51: The method of aspect 50, wherein the subsets of bits comprises a first subset of bits associated with the first network entity and a second subset of bits associated with the second network entity based at least in part on the first network entity and the second network entity being different network entities.

Aspect 52: The method of aspect 51, wherein the first subset of bits indicates a first set of resource block set indices allocated for transmission of the uplink shared channel messages to the first network entity and the second subset of bits indicates a second set of resource block set indices allocated for transmission of the uplink shared channel messages to the first network entity.

Aspect 53: The method of any of aspects 50 through 52, wherein a number of the subsets of bits included in the first set of bits is based at least in part on a number of network entities configured to be scheduled by the downlink control information message.

Aspect 54: The method of any of aspects 34 through 53, wherein transmitting the second set of bits comprises: transmitting multiple second sets of bits, wherein each multiple is associated with a different network entity, and wherein each multiple indicates a set of resource block set indices associated with a corresponding network entity.

Aspect 55: The method of aspect 54, wherein a number of multiples of the multiple second sets of bits is based at least in part on a number of network entities configured to be scheduled by the downlink control information message.

Aspect 56: The method of any of aspects 34 through 55, wherein transmitting the second set of bits comprises: transmitting the second set of bits comprising subsets of bits, wherein each subset of bits is associated with a different group of one or more network entities, and wherein each subset of bits indicates a set of resource block indices associated with a corresponding group of network entities.

Aspect 57: The method of aspect 56, wherein a number of subsets of bits included in the second set of bits is based at least in part on a number of groups of network entities configured to be scheduled by the downlink control information message.

Aspect 58: The method of any of aspects 56 through 57, wherein the first network entity and the second network entity are included in a same group of network entities or different groups of network entities.

Aspect 59: The method of any of aspects 34 through 58, wherein transmitting the second set of bits comprises: transmitting the second set of bits that are commonly associated with at least the first network entity and the second network entity based at least in part on resource block set indices being assigned to resource block sets across at least the first network entity and the second network entity, wherein each bit in the second set of bits corresponds to a different resource block set index.

Aspect 60: The method of aspect 59, wherein the second set of bits indicates that consecutive resource block sets associated with the first network entity are scheduled by the downlink control information message, the method further comprising: identifying that resource blocks between the consecutive resource block sets are scheduled for the uplink shared channel messages based at least in part on the consecutive resource block sets being associated with a same network entity.

Aspect 61: The method of any of aspects 59 through 60, wherein the second set of bits indicates that a first resource block set associated with the first network entity and a consecutive resource block set associated with the second network entity are scheduled by the downlink control information message, the method further comprising: identifying that resource blocks between the first resource block set and the consecutive resource block set are unscheduled for the uplink shared channel messages based at least in part on the first resource block set and the consecutive resource block set being associated with different network entities.

Aspect 62: The method of any of aspects 59 through 61, wherein a number of bits included in the second set of bits is based at least in part on a number of resource block sets allocated across at least the first network entity and the second network entity.

Aspect 63: The method of any of aspects 34 through 62, wherein transmitting the first set of bits and the second set of bits comprises: transmitting a message comprising the first set of bits and the second set of bits.

Aspect 64: The method of aspect 63, wherein the message is the downlink control information message.

Aspect 65: The method of any of aspects 34 through 64, wherein a format of the downlink control information message is based at least in part on the downlink control information message scheduling the uplink shared channel messages to at least the first network entity and the second network entity in accordance with the resource allocation type.

Aspect 66: The method of any of aspects 34 through 65, wherein a number of bits included in the first set of bits is based at least in part on a subcarrier spacing associated with the one or more resource blocks.

Aspect 67: An apparatus for wireless communications at a UE, comprising a processor; memory coupled with the processor; and instructions stored in the memory and executable by the processor to cause the apparatus to perform a method of any of aspects 1 through 33.

Aspect 68: An apparatus for wireless communications at a UE, comprising at least one means for performing a method of any of aspects 1 through 33.

Aspect 69: A non-transitory computer-readable medium storing code for wireless communications at a UE, the code comprising instructions executable by a processor to perform a method of any of aspects 1 through 33.

Aspect 70: An apparatus for wireless communications at a first network entity, comprising a processor; memory coupled with the processor; and instructions stored in the memory and executable by the processor to cause the apparatus to perform a method of any of aspects 34 through 66.

Aspect 71: An apparatus for wireless communications at a first network entity, comprising at least one means for performing a method of any of aspects 34 through 66.

Aspect 72: A non-transitory computer-readable medium storing code for wireless communications at a first network entity, the code comprising instructions executable by a processor to perform a method of any of aspects 34 through 66.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communications at a user equipment (UE), comprising:
   a processor;
   memory coupled with the processor; and
   instructions stored in the memory and executable by the processor to cause the apparatus to:
      receive a downlink control information message that includes a frequency domain resource assignment field that schedules uplink shared channel messages to at least a first network entity and a second network entity in accordance with a resource allocation type, wherein the frequency domain resource assignment field includes a first block of bits associated with the first network entity and a second block of bits associated with the second network entity;
      receive, via the first block of bits, a first set of bits indicative of one or more resource block indices and a second set of bits indicative of one or more resource block set indices based at least in part on the resource allocation type;
      receive, via the second block of bits, a third set of bits indicative of one or more resource block indices and a fourth set of bits indicative of one or more resource block set indices based at least in part on the resource allocation type; and
      transmit the uplink shared channel messages to at least the first network entity and the second network entity in accordance with the first block of bits and the second block of bits.

2. The apparatus of claim 1, wherein the first set of bits indicative of one or more resource block indices are associated with a first interlace pattern for the first network entity, and wherein the third set of bits indicative of one or more resource block indices are associated with a second interlace pattern for the second network entity.

3. The apparatus of claim 1, wherein the instructions to receive the downlink control information message are executable by the processor to cause the apparatus to:
   receive, via the frequency domain resource assignment field, a plurality of blocks of bits including the first block of bits and the second block of bits, wherein each block of bits of the plurality of blocks of bits is associated with a different network entity.

4. The apparatus of claim 3, wherein each block of bits of the plurality of blocks of bits comprises a respective first set of bits indicative of one or more resource block indices and a respective second set of bits indicative of one or more resource block set indices.

5. The apparatus of claim 3, wherein a quantity of blocks of bits of the plurality of blocks of bits is based at least in part on a quantity of network entities configured to be scheduled by the downlink control information message.

6. The apparatus of claim 1, wherein a first resource block set configuration indicated by the first block of bits associated with the first network entity is different from a second resource block set configuration indicated by the second block of bits associated with the second network entity based at least in part on intra-cell guard band configurations associated with the respective first and second network entities.

7. The apparatus of claim 6, wherein each resource block set configuration, of the first resource block set configuration and the second resource block set configuration, is indicative of a starting common resource block index and a quantity of common resource blocks associated with each resource block set, the starting common resource block index, the quantity of common resource blocks, or both being different for resource block sets configured for the first network entity and the second network entity.

8. A method for wireless communications at a user equipment (UE), comprising:
   receiving a downlink control information message that includes a frequency domain resource assignment field that schedules uplink shared channel messages to at least a first network entity and a second network entity in accordance with a resource allocation type, wherein the frequency domain resource assignment field includes a first block of bits associated with the first network entity and a second block of bits associated with the second network entity;
   receiving, via the first block of bits, a first set of bits indicative of one or more resource block indices and a second set of bits indicative of one or more resource block set indices based at least in part on the resource allocation type;
   receiving, via the second block of bits, a third set of bits indicative of one or more resource block indices and a fourth set of bits indicative of one or more resource block set indices based at least in part on the resource allocation type; and
   transmitting the uplink shared channel messages to at least the first network entity and the second network entity in accordance with the first block of bits and the second block of bits.

9. An apparatus for wireless communications at a user equipment (UE), comprising:
   means for receiving a downlink control information message that includes a frequency domain resource assignment field that schedules uplink shared channel messages to at least a first network entity and a second network entity in accordance with a resource allocation type, wherein the frequency domain resource assignment field includes a first block of bits associated with the first network entity and a second block of bits associated with the second network entity;
   means for receiving, via the first block of bits, a first set of bits indicative of one or more resource block indices and a second set of bits indicative of one or more resource block set indices based at least in part on the resource allocation type;
   means for receiving, via the second block of bits, a third set of bits indicative of one or more resource block indices and a fourth set of bits indicative of one or more resource block set indices based at least in part on the resource allocation type; and
   means for transmitting the uplink shared channel messages to at least the first network entity and the second network entity in accordance with the first block of bits and the second block of bits.

10. A non-transitory computer-readable medium storing code for wireless communications at a user equipment (UE), the code comprising instructions executable by a processor to:
receive a downlink control information message that includes a frequency domain resource assignment field that schedules indicating that uplink shared channel messages to at least a first network entity and a second network entity are scheduled in accordance with a resource allocation type, wherein the frequency domain resource assignment field includes a first block of bits associated with the first network entity and a second block of bits associated with the second network entity;
receive, via the first block of bits, a first set of bits indicative of one or more resource block indices and a second set of bits indicative of one or more resource block set indices based at least in part on the resource allocation type;
receive, via the second block of bits, a third set of bits indicative of one or more resource block indices and a fourth second set of bits indicative of one or more resource block set indices based at least in part on the resource allocation type; and
transmit the uplink shared channel messages to at least the first network entity and the second network entity in accordance with the first block of bits and the second block of bits.

11. The apparatus of claim 1, wherein a first quantity of bits included in the first set of bits of the first block of bits and a second quantity of bits of the third set of bits of the second block of bits is based at least in part on a subcarrier spacing of an active uplink bandwidth part of the UE.

12. The apparatus of claim 11, wherein the first quantity of bits and the second quantity of bits comprise five bits based at least in part on the subcarrier spacing being 30 kilohertz.

13. The apparatus of claim 11, wherein the first quantity of bits and the second quantity of bits comprise six bits based at least in part on the subcarrier spacing being 15 kilohertz.

14. The method of claim 8, wherein the first set of bits indicative of one or more resource block indices are associated with a first interlace pattern for the first network entity, and wherein the third set of bits indicative of one or more resource block indices are associated with a second interlace pattern for the second network entity.

15. The method of claim 8, wherein receiving the downlink control information message further comprises:
receiving, via the frequency domain resource assignment field, a plurality of blocks of bits including the first block of bits and the second block of bits, wherein each block of bits of the plurality of blocks of bits is associated with a different network entity.

16. The method of claim 15, wherein each block of bits of the plurality of blocks of bits comprises a respective first set of bits indicative of one or more resource block indices and a respective second set of bits indicative of one or more resource block set indices.

17. The method of claim 15, wherein a quantity of blocks of bits of the plurality of blocks of bits is based at least in part on a quantity of network entities configured to be scheduled by the downlink control information message.

18. The method of claim 8, wherein a first resource block set configuration indicated by the first block of bits associated with the first network entity is different from a second resource block set configuration indicated by the second block of bits associated with the second network entity based at least in part on intra-cell guard band configurations associated with the respective first and second network entities.

19. The method of claim 18, wherein each resource block set configuration, of the first resource block set configuration and the second resource block set configuration, is indicative of a starting common resource block index and a quantity of common resource blocks associated with each resource block set, the starting common resource block index, the quantity of common resource blocks, or both being different for resource block sets configured for the first network entity and the second network entity.

20. The method of claim 8, wherein a first quantity of bits included in the first set of bits of the first block of bits and a second quantity of bits of the third set of bits of the second block of bits is based at least in part on a subcarrier spacing of an active uplink bandwidth part of the UE.

21. The method of claim 20, wherein the first quantity of bits and the second quantity of bits comprise five bits based at least in part on the subcarrier spacing being 30 kilohertz.

22. The method of claim 20, wherein the first quantity of bits and the second quantity of bits comprise six bits based at least in part on the subcarrier spacing being 15 kilohertz.

23. The apparatus of claim 9, wherein the first set of bits indicative of one or more resource block indices are associated with a first interlace pattern for the first network entity, and wherein the third set of bits indicative of one or more resource block indices are associated with a second interlace pattern for the second network entity.

24. The apparatus of claim 9, wherein means for receiving the downlink control information message further comprises:
means for receiving, via the frequency domain resource assignment field, a plurality of blocks of bits including the first block of bits and the second block of bits, wherein each block of bits of the plurality of blocks of bits is associated with a different network entity.

25. The apparatus of claim 24, wherein each block of bits of the plurality of blocks of bits comprises a respective first set of bits indicative of one or more resource block indices and a respective second set of bits indicative of one or more resource block set indices.

26. The apparatus of claim 24, wherein a quantity of blocks of bits of the plurality of blocks of bits is based at least in part on a quantity of network entities configured to be scheduled by the downlink control information message.

27. The non-transitory computer-readable medium of claim 10, wherein the first set of bits indicative of one or more resource block indices are associated with a first interlace pattern for the first network entity, and wherein the third set of bits indicative of one or more resource block indices are associated with a second interlace pattern for the second network entity.

28. The non-transitory computer-readable medium of claim 10, wherein, to receive the downlink control information message, the instructions are executable by the processor to:
receive, via the frequency domain resource assignment field, a plurality of blocks of bits including the first block of bits and the second block of bits, wherein each block of bits of the plurality of blocks of bits is associated with a different network entity.

29. The non-transitory computer-readable medium of claim 28, wherein each block of bits of the plurality of blocks of bits comprises a respective first set of bits indicative of one or more resource block indices and a respective second set of bits indicative of one or more resource block set indices.

30. The non-transitory computer-readable medium of claim 28, wherein a quantity of blocks of bits of the plurality of blocks of bits is based at least in part on a quantity of network entities configured to be scheduled by the downlink control information message.

\* \* \* \* \*